United States Patent
Raghupathy et al.

(10) Patent No.: US 12,546,902 B2
(45) Date of Patent: Feb. 10, 2026

(54) HYBRID POSITION NAVIGATION AND TIMING SYSTEM

(71) Applicant: NextNav, LLC, Sunnyvale, CA (US)

(72) Inventors: Arun Raghupathy, Bangalore (IN); Sameet Deshpande, Calgary (CA); Payam Dehghani Rahimzadeh, Calgary (CA); Ganesh Pattabiraman, Saratoga, CA (US)

(73) Assignee: NextNav, LLC, Sunnyvale, CA (US)

( * ) Notice: Subject to any disclaimer, the term of this patent is extended or adjusted under 35 U.S.C. 154(b) by 124 days.

(21) Appl. No.: 18/495,490

(22) Filed: Oct. 26, 2023

(65) Prior Publication Data
US 2024/0151858 A1    May 9, 2024

Related U.S. Application Data

(60) Provisional application No. 63/381,336, filed on Oct. 28, 2022.

(51) Int. Cl.
    *G01S 19/39*     (2010.01)
    *G01S 19/40*     (2010.01)

(52) U.S. Cl.
    CPC ............ *G01S 19/393* (2019.08); *G01S 19/40* (2013.01)

(58) Field of Classification Search
    CPC .............................. G01S 19/393; G01S 19/40
    See application file for complete search history.

(56) References Cited

U.S. PATENT DOCUMENTS

| | | | | |
|---|---|---|---|---|
| 5,373,298 A * | 12/1994 | Karouby | ................ | G01S 19/39 455/12.1 |
| 6,084,544 A * | 7/2000 | Camp, Jr. | ............... | G01S 19/40 701/470 |
| 6,420,999 B1 | 7/2002 | Vayanos | | |
| 7,190,271 B2 * | 3/2007 | Boyd | ...................... | G01S 5/021 340/572.1 |
| 7,978,680 B1 * | 7/2011 | Vandwalle | ............ | H04J 3/0664 370/503 |
| 8,193,984 B2 * | 6/2012 | Ward | ...................... | G01S 5/021 342/465 |
| 8,249,049 B2 * | 8/2012 | Silverman | ......... | H04W 56/0075 709/224 |

(Continued)

FOREIGN PATENT DOCUMENTS

CN      114924298 A      8/2022

OTHER PUBLICATIONS

Chang et al., "A New Energy-Efficient Time Synchronization Protocol in Wireless Sensor Networks", 2014 IEEE, International Conference on Computer & Information Technology, IEEE, Sep. 11, 2014, pp. 684-688, XP032702950.

(Continued)

*Primary Examiner* — Ramsey Refai
(74) *Attorney, Agent, or Firm* — Kubota & Basol LLP

(57) ABSTRACT

A method includes a mobile device receiving a plurality of first signals from one or more first transmitters in a network. Each first signal has first data including an associated time that is non-synchronized to the time of another first signal of the plurality of first signals. One or more processors synchronizes the associated time of each first signal to a common time scale. One or more processors determines a position of the mobile device using a common time scale of the plurality of first signals.

18 Claims, 15 Drawing Sheets

(56) References Cited

U.S. PATENT DOCUMENTS

| | | | |
|---|---|---|---|
| 8,954,608 B1* | 2/2015 | Tomic | G06F 1/12 |
| | | | 709/248 |
| 9,612,334 B2* | 4/2017 | Gutt | G01S 19/40 |
| 9,693,325 B1* | 6/2017 | Park | H04W 56/0005 |
| 9,967,845 B2 | 5/2018 | Raghupathy et al. | |
| 10,231,201 B2 | 3/2019 | Meiyappan et al. | |
| 11,194,012 B2* | 12/2021 | Im | G01S 5/02216 |
| 11,391,571 B2* | 7/2022 | Stelfox | A63F 13/828 |
| 11,460,584 B2 | 10/2022 | Fischer et al. | |
| 2001/0008393 A1* | 7/2001 | Valio | G01S 5/0045 |
| | | | 342/357.42 |
| 2005/0021284 A1 | 1/2005 | Gaal | |
| 2005/0169233 A1* | 8/2005 | Kandala | H04J 3/0664 |
| | | | 370/336 |
| 2005/0192024 A1 | 9/2005 | Sheynblat et al. | |
| 2006/0064244 A1 | 3/2006 | Robbins | |
| 2010/0279707 A1 | 11/2010 | Fischer et al. | |
| 2011/0199255 A1* | 8/2011 | Murray | G01S 5/021 |
| | | | 342/451 |
| 2011/0244891 A1 | 10/2011 | Ghinamo | |
| 2011/0285589 A1 | 11/2011 | Bull | |
| 2012/0182180 A1 | 7/2012 | Wolf et al. | |
| 2012/0249233 A1 | 10/2012 | Farahani Samani et al. | |
| 2012/0300795 A1 | 11/2012 | Joergensen | |
| 2013/0148639 A1 | 6/2013 | Gao et al. | |
| 2013/0293415 A1* | 11/2013 | Gutt | G01S 19/40 |
| | | | 342/357.25 |
| 2014/0211781 A1 | 7/2014 | Kim et al. | |
| 2016/0057684 A1 | 2/2016 | Larsson et al. | |
| 2018/0284288 A1 | 10/2018 | Lentz et al. | |
| 2019/0146095 A1 | 5/2019 | Zhuang et al. | |
| 2019/0187294 A1 | 6/2019 | Khalajmehrabadi et al. | |
| 2020/0363536 A1 | 11/2020 | Garitselov et al. | |

OTHER PUBLICATIONS

Form PCT/ISA/206, PCT/US2015/062997, "Invitation to Pay Additional Fees and, Where Applicable, Protest Fee", 5 page(s). Date of Mailing Mar. 2, 2016.

Form PCT/ISA/220, PCT/US2015/062997, "Notification of Transmittal of the International Search Report and the Written Opinion of the International Searching Authority, or the Declaration", 1 page(s); Form PCT/ISA/210, PCT/US2015/062997, "International Search Report ", 5 page(s); Form PCT/ISA/237, PCT/US2015/062997, "Written : Opinion of the International Searching Authority", 7 page(s). Dale of Mailing May 17, 2016.

International Search Report and Written Opinion dated Mar. 21, 2024 for PCT Patent Application No. PCT/IB2023/060824.

Invitation to Pay Additional Fees dated Jan. 29, 2024 for International Patent Application PCT/I B2023/060824.

\* cited by examiner

HYBRID POSITION NAVIGATION AND TIMING SYSTEM

RELATED APPLICATIONS

This application claims priority to U.S. Provisional Patent Application No. 63/381,336 filed on Oct. 28, 2022, which is hereby incorporated by reference in full.

BACKGROUND

A terrestrial Positioning, Navigation, and Timing (PNT) system typically uses purpose-built beacons or transmitters for transmitting signals that receivers in mobile devices can use to triangulate their location or estimate signal timing information or both. To provide adequate coverage of beacon signals within a given geographic area, the terrestrial PNT system has to have a sufficient number of transmitters placed at strategic locations throughout the geographic area. There is a tradeoff, however, between the cost of the terrestrial PNT system and the level of coverage within the geographic area, because more transmitters are needed to provide better coverage and thus better location capabilities, but more transmitters also means a higher cost. Thus, a system that is purposely built to provide terrestrial location services typically has as few transmitters as possible, but this can run the risk of not providing adequate beacon signal coverage in some parts of the covered area.

SUMMARY

A method is disclosed and includes a mobile device receiving a plurality of first signals from one or more first transmitters in a network. Each first signal has first data including an associated time that is non-synchronized to the time of another first signal of the plurality of first signals. One or more processors synchronizes the associated time of each first signal to a common time scale. One or more processors determines a position of the mobile device using a common time scale of the plurality of first signals.

DETAILED DESCRIPTION

Figure 1:
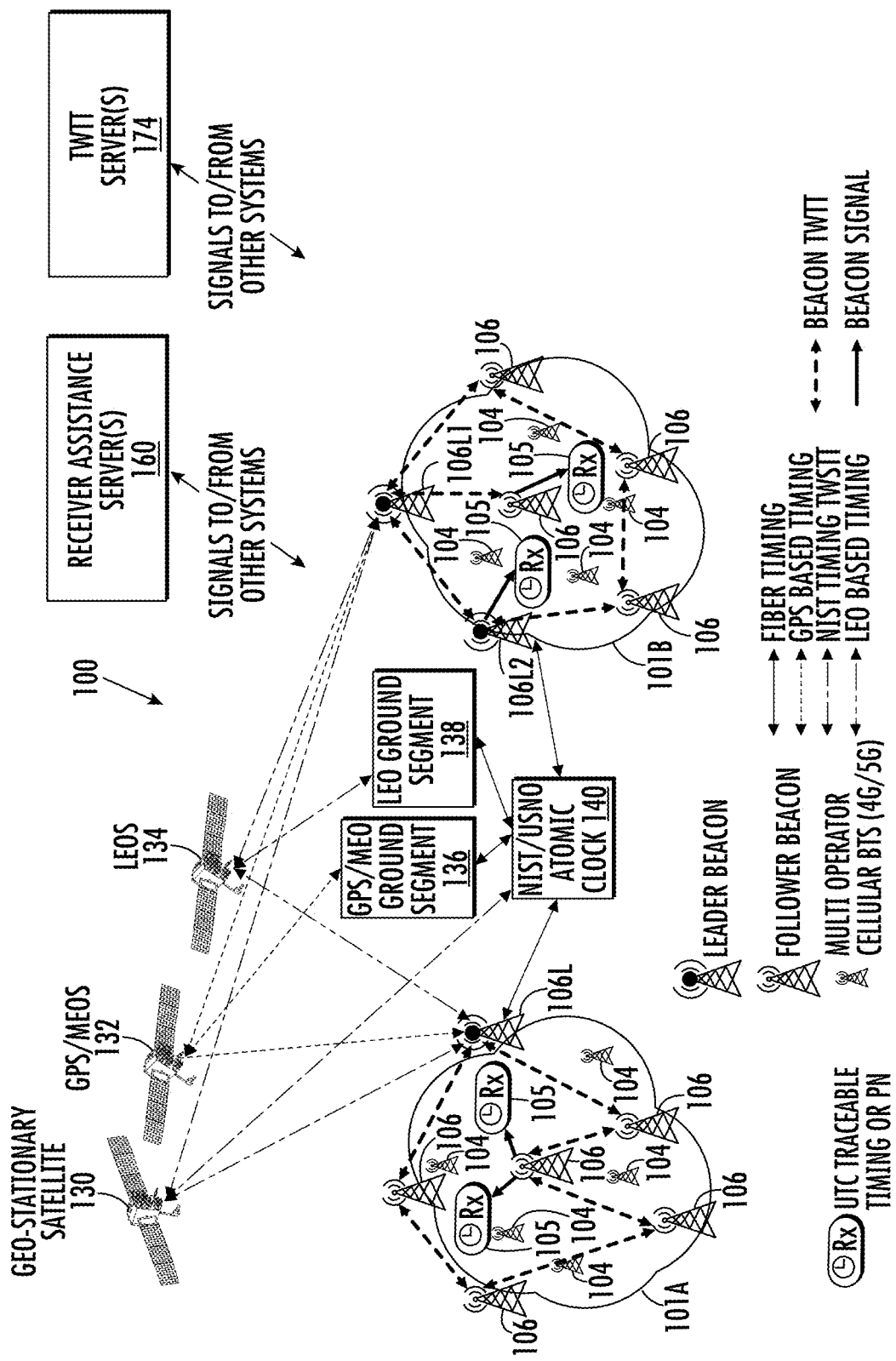
FIG. 1 is a simplified diagram of a resilient position, navigation, and timing (PNT) system, in accordance with some embodiments.

In some embodiments, a purpose-built terrestrial PNT system is combined with one or more existing signals of opportunity (SoOP) to form a hybrid PNT system for estimating the location of a device (e.g., a mobile device, smartphone, cell phone, computer, game console, smart watch, etc.). As known in the art, a PNT system determines position, navigation, and timing for a device. Although the hybrid PNT system disclosed herein is referred to as a PNT system for simplicity or convenience of description, it is understood that the system can determine any combination of one or more of position, navigation, and timing.

A Signal of Opportunity (SoOp) is a signal or source of data that is not originally intended for a specific purpose but can be repurposed or used opportunistically for various applications. These signals are often unintentional emissions or transmissions that can provide valuable information when captured and processed. In this context, the SoOp may be any signal that can be utilized for positioning, navigation, or timing. For example, satellite TV, Wi-Fi signals, Bluetooth, or cell phone signals can be considered signals of opportunity because they can be used for geolocation and timing synchronization in addition to their primary communication or other non-PNT purposes. In other words, the SoOP can be any wireless signal (terrestrial or satellite-based) of any non-location-based system (i.e., not specifically built for the purpose of determining location) that can be used to determine range, pseudorange, or time of arrival (TOA), as well as auxiliary measurements such as Doppler, even if the signal is not intended to be used in this manner. Thus, such signals may include signals meant for data communication such as cellular (3G/4G/5G) deployments, WiFi transmitters, Bluetooth transmitters, digital TV, and other appropriate systems that broadcast digital signals with timing information.

In some embodiments, the hybrid PNT system (e.g., a purpose-built terrestrial PNT system that also utilizes one or more existing SoOP) reduces the cost and time to implement the terrestrial PNT system by enabling the use of an appropriate, available SoOP in conjunction with signals from the terrestrial PNT system. Accordingly, the hybrid PNT system can be implemented with fewer purpose-built PNT transmitters (e.g., beacons or base stations built specifically for the purpose of location estimation by a receiver in a mobile device) than would be needed if a location system used only transmitters of the purpose-built terrestrial PNT system. In other embodiments, and at the basic level, the hybrid PNT system is comprised of only one or more SoOP systems (hence, no purpose-built PNT transmitters) and other additional network elements that enable improvement in the quality of the PNT solution over using SoOP as is. The purpose-built terrestrial PNT system is complemented by one or more existing SoOPs and one or more different types of SoOP systems, thereby forming a hybrid system for the estimation of location.

One of the potential issues with using some types of SoOPs involves time synchronization errors. Coordinated Universal Time (UTC) is the primary time standard by which the world regulates and synchronizes time. It is an atomic time scale that serves as the basis for timekeeping worldwide and is maintained by a network of highly precise atomic clocks located in various national and international laboratories. The purpose-built terrestrial PNT system is a synchronous system, using a common time scale such as UTC, which enables a relatively high level of synchronization for the system. However, other data communication systems typically do not need, and therefore do not have, the same level of synchronization that a PNT system needs. In other words, base stations of data communication systems typically use a local time scale rather than a common time scale such as UTC and are therefore, not well synchronized with each other. For example, cellular 4G synchronization requirements are on the order of microseconds (e.g., generally at about 1.5 µs), and Code Division Multiple Access (CDMA) systems generally have timing requirements of about 100 nanoseconds (ns). Yet, a sync error of just 100 ns can result in about a 30-meter location error, which is relatively coarse and limited accuracy for a timing/location system.

Additionally, other range estimation approaches using asynchronous systems or coarsely synchronized systems (e.g., with sync errors of about 30-100 ns or more) can utilize two-way communication to determine round trip timing or range so that sync errors do not limit performance. However, this approach involves a requirement to transmit signals, or the usage of bandwidth in the uplink. As such, this approach is not a true SoOP, but it can be considered as such when such cost of transmission or bandwidth required is negligible. In the case of downlink signals, downlink signals generally have some portion allocated for sync and to aid in data demodulation. Therefore, some embodiments can use these types of signals as a SoOP since they are already transmitted for other reasons and are thus readily available.

U.S. Pat. No. 9,629,111, which issued on Apr. 18, 2017, and is assigned in common with the present application, discloses Systems and Methods for Virtually Synchronizing Unsynchronized or Loosely Synchronized Networks for Position Location Determination, and is incorporated by reference as if fully set forth herein.

One possible approach to overcome sync errors is to use "listening devices" that have a common time scale (e.g., a common or standard time scale such as UTC or a time scale with a deterministic offset relative to a such a common or standard time scale) or have time scales that can be related to each other. In this context, the terms "listen" and "hear", in both present tense and past tense (e.g., "heard"), means to receive and process signals (such as cellular signals, Wifi signals, Bluetooth signals, etc.). A listening device, as disclosed herein, is a signal receiver or scanner unit that is deployed within a region in order to determine and track critical parameters of received signals, such as timing differences, as described in further detail below.

The use of the purpose-built terrestrial PNT system with only a few or sparsely placed transmitters (i.e., a "thin" network, as opposed to a fully robust system that does not need to use a SoOP), which is synched to a common time such as UTC time, facilitates synchronizing the time scale at the listening devices by distributing timing synchronization information to the listening devices. The timing synchronization information may either be distributed wirelessly to the listening devices or may be already available at a beacon of the purpose-built terrestrial PNT system (if the listening devices are co-located with the beacon so that the common time scale is automatically available). The listening devices receive the SoOP and determine the sync therefore using the received timing information. Such embodiments create a GPS-free timing distribution system that will then facilitate the time sync to a common scale, which satisfies the reliability requirements with timing traceability to UTC.

Another alternative to distributing a common time scale to the listening devices is by transferring time between the listening devices using signals in common view. In this context, common view is when two or more different devices receive the same signal from a given transmitter. The signals in common view can be any signal that has a time signature (i.e., pre-defined points on the waveform which are transmitted at specific times relative to a local time scale) embedded in the signal waveform, and for which the location from which the signal is transmitted is known. Time of arrival (TOA) measurements of the common view signals on the respective local time scales for a plurality of listening devices can be exchanged. The measurements exchanged can optionally, include a frequency offset measurement as well. After removing the time corresponding to the distance between the common view source and listening devices, time corrections for the local time scale of each listening device can be derived relative to an arbitrary common time scale. In some embodiments, it is not necessary for the common view signals to be synchronized to a standard scale. In this example, the common time scale can be a local time of one of the listening devices or a standard time scale (for example, if one or more of the listening devices is synchronized to a standard time scale such as UTC, then the common time scale can be chosen as that standard). Examples of such common view signals include satellite signals (such as GNSS, LEO), TV transmitter signals, cellular signals.

For example, if a common view signal is available to a pair of listening devices whose locations are known, then time can be transferred between them. By using the time of arrival measurements corresponding to the common signature transmitted by the common view signal source at the pair of listening devices, subtracting off the range from common view signal source to the respective listening device to derive the local time at the time the signature was transmitted by the common view signal, and then, using the two local times at the two listening devices at the time the signature was transmitted by the common view signal source, the relative timing between the two local time scales at the two listening devices can be derived. Similarly, the frequency can be transferred by comparing the frequency offset measurements of the common view signal. The two listening devices can be brought to a common time scale by choosing one of them arbitrarily as the reference and correcting the other time scale by the difference between the time scales. In general, the optimal solution for such a problem is to use common view signal measurements from common view signals at multiple listening devices to derive the relative time scale corrections for all listening devices. Time can be transferred to any listening device that has at least one other listening device that can hear at least one common view signal.

Another potential issue for using some types of SoOPs involves near-far, and/or geometry, issues. Two-way communication systems and broadcast data communication systems, for example, are built for geographic area coverage (e.g., using either a single source to cover a geographical area in some situations or multiple sources in situations using soft combining or handoff procedures). For example, a single measurement from a single signal source heard at the receiver will not allow to solve for the latitude and longitude coordinates. In general, a receiver will need at least three independent measurements when using one-way pseudorange measurements to solve for the three variables in 2-D position determination viz. latitude, longitude and unknown receiver time bias. Similarly, a receiver will need at least two independent measurements when using two-way range measurements to solve for the two variables in 2-D position determination viz. latitude, longitude. It is also well known that for accurate positioning the received signal measurements should be geographically well distributed (e.g., having a good Horizontal Dilution of Precision, HDOP). Such SoOP systems, therefore, are not well suited for location determination using trilateration in its full coverage area due to a lack of sufficient geographically well distributed transmitters that can be heard at the receiver. Additionally, the proximity of a receiver to a nearby transmitter may cause high-amplitude signals received from that transmitter to mask significantly lower amplitude signals received from transmitters farther away from the receiver, thereby further reducing the number of available geographically diverse received signals.

Near-far problems may lead to situations in which there are a limited number of transmitters and/or limited geometry for a receiver's (e.g., mobile device) location. "Bad geometry" generally means there is not a group of well-distributed transmitters within an appropriate range around the receiver's location. "Well-distributed" transmitters in the azimuth (i.e., horizontally) are generally measured using a metric called Horizontal Dilution of Precision (HDOP) in GPS/location terminology.

As described above, if a mobile device gets relatively close to a signal transmitter, then the mobile device "hears" only signals from that transmitter. Therefore, a conventional approach to mitigate near-far problems is to estimate and use interference cancellation of stronger signals so that the weaker signals can be more easily heard, but this technique still has limitations.

Additionally, another approach to mitigate near-far problems is one of using a diversity of multiple SoOP systems that are spatially distributed within a desired area or within an appropriate range of a mobile device. Thus, if near-far issues limit signals near one SoOP system, other different SoOP systems in the same general area are likely to have different transmitter locations (and therefore different areas of near-far problems), so that the receiver always has enough signals to tri-laterate when using all these different SoOP systems together. In other words, the hybrid PNT system disclosed herein can be implemented to use transmitters of multiple different types of SoOP systems together, instead of using transmitters of just one type of SoOP system. Although each SoOP system might have a near-far problem, the combination of several different types of SoOP systems can overcome the individual near-far problems.

Another approach to mitigate the lack of good measurements is to include beacons of the purpose-built terrestrial PNT system (i.e., a targeted terrestrial system) to "fill in" areas to provide additional measurements where the performance of available SoOP systems is limited.

Embodiments described herein for the hybrid PNT system mitigate the near-far problems to achieve a desired or required position, navigation, and timing (PNT) accuracy. In some embodiments, the timing of a SoOP is synchronized to a common time scale. In some embodiments, multiple SoOP systems are utilized to determine the PNT solution, and the timing of signals received from the multiple SoOP systems are synchronized to a common time scale. In some embodiments, the purpose-built terrestrial PNT system is implemented with the addition of beacons/transmitters (e.g., fill-in beacons) for a cost-effective solution, and the signals from the beacons/transmitters are synchronized to a common time scale.

In a technical approach for the timing (T) and position/navigation (PN) of the hybrid PNT system, various aspects of the SoOP can be monitored and estimated—such as synchronization errors, coordinates of the SoOP, signal measurement stability metrics, signal identity, or other changes, using the listening devices. The listening devices are referred to herein as Signal Monitoring Units (SMUs). The listening devices performing a subset of the functions described above are sometimes referred to as location monitoring units (LMU) or timing monitoring units (TMU). "SMU" is used as a term to represent a broader functionality than the traditionally used LMUs and TMUs. The listening devices may or may not be co-located with beacons of the purpose-built terrestrial PNT system or the SoOP emitters/transmitters. Note that all listening devices may or may not monitor all metrics mentioned above. For example, some may not monitor timing synchronization at all and only monitor signal identity changes.

The listening devices may or may not be purpose built and can include any device that has SoOP listening capability. For example, signal identity changes can be monitored and coarse coordinates of the SoOP can be determined opportunistically by, for example, cellular phones or IoT devices that have SoOP listening capabilities. Additionally, the number of such listening devices may depend, for example, on the type of SoOP signal being listened to, the architecture of the signal network, and the signal processing capabilities of the listening devices with respect to their ability to receive the signals and estimate the timing of relatively far-away transmitters. The same SoOP signal can be listened to by multiple listening devices having access to a common time scale, and, in that case, the optimal estimate of signal time sync error can be obtained using these multiple measurements to optimally determine the sync error of a particular SoOP signal transmitter. For example, one approach is to select the sync error derived from the link (between the SoOP emitter/transmitter and the listening devices) which provides the earliest time of arrival estimate corresponding to the link that has the least multipath delay. Note that in the case of SoOp transmissions using multiple antenna systems, the earliest time of arrival estimate from a SoOP emitter to a listening device can be computed across antenna ports or physical antenna elements or sectors. In other embodiments, the sync error is determined by averaging the individual sync errors for all of the links. The sync error may also be determined by the link with the highest SNR.

In some embodiments, a dynamic (i.e., changeable with time) database of respective sync errors for the SoOPs can be created. Note that the database can also hold the dynamic time slope of the sync errors (for example, the frequency offset) of the SoOP. The dynamic database can exist on a server/cloud entity with which the listening devices communicate.

In some embodiments, the locations and synchronization errors of the SoOP transmitters can be determined, for example, by i) using SoOP measurements such as their time of arrivals (TOA) and Doppler (for example, when moving) on a receiver at known locations, fixed or moving, and/or known timing ii) receiving signals from multiple SoOP transmitters and calculating the locations and/or synchronization errors/frequency offset of the SoOP transmitters by trilateration or optimization to find the unknown location and/or sync error and/or frequency offset. In one embodiment, known locations from database sources of the operators of the SoOP transmitters or other providers of such databases may be used to determine only synchronization time and frequency error using the SoOP measurements mentioned above. For example, the TOA measurement of a SoOP transmitter is the sum of the SoOP transmitter range (i.e., distance, e.g., Euclidean, from SoOP transmitter location to receiver location), synchronization offset of the SoOP transmitter, and the receiver time offset of the receiver used for the measurements. When several such TOA measurements across different receiver positions are available and if the receiver location is known, the problem can be formulated as an optimization problem in the unknowns (e.g., SoOP transmitter locations and/or sync error, receiver time offset). If the receiver time offset is known, then the number of unknowns can be reduced in the optimization. A similar formulation can be applied for the frequency offset determination. The measured Doppler is the sum of the frequency offset of the SoOP transmitter and the Doppler of the receiver (when mobile) relative to the SoOP transmitter due to its velocity. When the velocity of the receiver is known, then the Doppler of the receiver relative to SoOP transmitter is known and the frequency offset of the SoOP transmitter can be determined.

An example approach could be to drive or fly a vehicle, drone or helicopter (with a known location and timing determined by sources such as GPS/GNSS/IMU) within an area and use measurements at the vehicle, drone or helicopter to determine the timing and/or frequency and/or location of the SoOP transmitters. Simultaneous measurement of SoOP transmissions at listening devices and at known locations, fixed or moving, while having access to a common time scale (frequency and time), allows sync error estimation to be improved at the listening devices. In the case where the wireless channel from the listening devices to a Base Transmitter System (BTS) of a cellular network is limited by blockage or multipath delays, which limit the SoOP measurement (e.g., TOA) estimation quality and, therefore, BTS sync error determination at the listening device, a simultaneous measurement from a known line-of-sight (LOS) or close to line LOS location (static or moving), allows the hybrid PNT system to correct for the blockage or multipath delay error by determining a multipath error correction. Similar correction can be derived for the Doppler measurement using simultaneous known line-of-sight (LOS) or close to line LOS location. If the channel between the listening device to BTS is relatively static, then this multipath error correction can be used to correct and improve the quality of the sync error estimate at the listening device. The frequency offset can be used for smoothing/filtering the time sync errors, where applicable. In SoOP transmitters, the time of transmit and carrier frequency are not generated by the same clock and in those cases, the frequency offset should not be used in filtering the time sync errors.

Once the SoOP transmitter locations and their synchronization offsets (time and frequency) are determined, this information can be stored, for example, in a database. The stored information can then be used in position determination of a mobile or other user equipment that can receive the SoOP transmitter signals. Similarly, the stored information can be used in a timing receiver to determine timing (for e.g., timing relative to a common standard timescale).

In some embodiments, timing synchronization corrections are provided to a mobile device for correction of timing/location (i.e., a user equipment (UE)-based computation system) of the SoOP measurements. In some embodiments, the timing sync errors of the SoOPs are corrected on a server (i.e., a UE-assisted system) for timing/location computation using SoOP measurements.

In some embodiments, a mobile device overcomes near-far problems by receiving signals from multiple (and multiple different types of) SoOP systems (for example: WiFi signals, digital TV signals, or cellular signals systems across different generations/operator) and uses this along with interference cancellation to get a good (e.g., quality TOA) set of measurements with good geometry. Optionally, this can be combined with pseudoranges for the purpose-built terrestrial PNT system for timing/position/navigation purposes.

In general, a timing receiver of a listening device can use known coordinates for its location and determine timing alone. Alternatively, it can determine its coordinates as well as the timing.

In cases in which the listening device uses only a SoOP receiver, the cost of the SoOP receiver (e.g., for cellular systems) may be less expensive than a receiver for the purpose-built terrestrial PNT system or the hybrid system.

Additionally, for a timing receiver using SoOP signals, the ability of the hybrid PNT system to also distribute timing traceable aligned to a common/standard time scale such as UTC, from the purpose-built terrestrial PNT system to the listening devices, allows for synchronization of the SoOP signals with the common time scale. This synchronization enables the timing receiver to obtain traceable timing accuracy.

Note that for 3-D position determination/navigation of the mobile device, the altitude may be determined using a pressure-based system. An example is shown in U.S. Pat. No. 10,805,452, which issued on Oct. 13, 2020, is assigned in common with the present application, and is incorporated by reference as if fully set forth herein. This technique may be combined with the 2-D coordinates viz. latitude, longitude, determined using one or more SoOP systems, or a purpose built terrestrial PNT system, or a purpose built terrestrial PNT system in conjunction with one or more SoOP systems as described in the earlier embodiments.

FIG. 1 is a simplified diagram of a resilient position, navigation, and timing (PNT) system 100, in accordance with some embodiments, that includes a purpose-built terrestrial PNT system. Multi-operator across Multiple-band cellular Base Transmitter Systems (BTS) 104 are also shown but are not described in this embodiment. The PNT system 100 is an example of a resilient PNT solution with very good performance relative to other types of systems. The PNT system 100 includes a full network build-out for a wide area coverage of the purpose-built terrestrial PNT system.

In an example network build and system option, the network and system configuration is a resilient PNT solution requiring a dedicated network, and include a baseline indoor PN capable network (e.g., of the purpose-built terrestrial PNT system) with terrestrial PNT receivers at a terrestrial PNT beacon 106. In some embodiments, there may be one or more leader terrestrial PNT beacons 106L (or 106L1, 106L2) that are in communication with the other terrestrial PNT beacons 106 (also known as follower PNT receivers). More than one leader (such as 106L1, 106L2) may be used for redundancy and additional resiliency against failure of one leader. The leader/follower subset networks are labeled as 101A and 101B of FIG. 1. The leader terrestrial PNT beacon 106L may receive signals from various sources such as a geo-stationary satellite 130, a GPS (i.e., or other GNSS systems) or medium-earth orbit satellite (MEOS) 132, a low-earth orbit satellite (LEOS) 134, and an atomic clock 140. The atomic clock 140 is a time source on the common time scale or standard time scale such as UTC, which may be maintained by an organization such as NIST or USNO. The atomic clock timing associated with a common or standard time scale can be distributed to the leader through fiber, satellites (MEOS/LEOS) or other means. In some embodiments, more than one leader, for example, terrestrial PNT beacons 106L2 can receive the signal from the atomic clock 140 (shown in subset network 101B) as opposed to a single leader terrestrial PNT beacon 106L (shown in subset network 101A). Each terrestrial PNT beacon 106 has a receiver and is configured to listen to other terrestrial PNT beacons 106. A receiver 105 may be a mobile device 108 or a UE timing receiver 188 (described in subsequent sections).

Further, the geo-stationary satellite 130 may communicate with the atomic clock 140, the GPS/MEOS 132 may communicate to a GPS/MEO ground segment 136, the LEOS 134 may communicate to a LEO ground segment 138, and the atomic clock 140 may communicate with the GPS/MEO ground segment 136 and the LEO ground segment 138.

In another example network build and system option, in some embodiments, the network and system configuration includes an indoor T (timing) capable network (e.g., of the purpose-built terrestrial PNT system) with outdoor PN capable network coverage. This is a resilient T and limited PN solution. It includes a dedicated T network for timing only (e.g., of the purpose-built terrestrial PNT system).

As described below, in another example network build and system option, in some embodiments, the network and system configuration includes outdoor listening devices only (e.g., of the purpose-built terrestrial PNT system) with SoOP technology-based receivers. It includes re-use of the signals from a multi-operator cellular network.

As described below, in another example network build and system option, in some embodiments, the network and system configuration includes an outdoor T capable network (e.g., of the purpose-built terrestrial PNT system), outdoor listening devices (optionally), fill-in beacons/transmitters of the purpose-built terrestrial PNT system or application-specific beacons, and either terrestrial PNT signal only receivers or hybrid technology-based receivers which are operable to receive terrestrial and SoOP signals. This is a resilient T and full-performance PN solution that utilizes the SoOP signals for indoor coverage. It includes a resilient Alternative Positioning, Navigation, and Timing (APNT) or Complementary Positioning, Navigation and Timing (CPNT) network that can operate for long periods is the absence of GPS/GNSS, and a re-use of the receiver cellular ecosystem.

Figure 2:
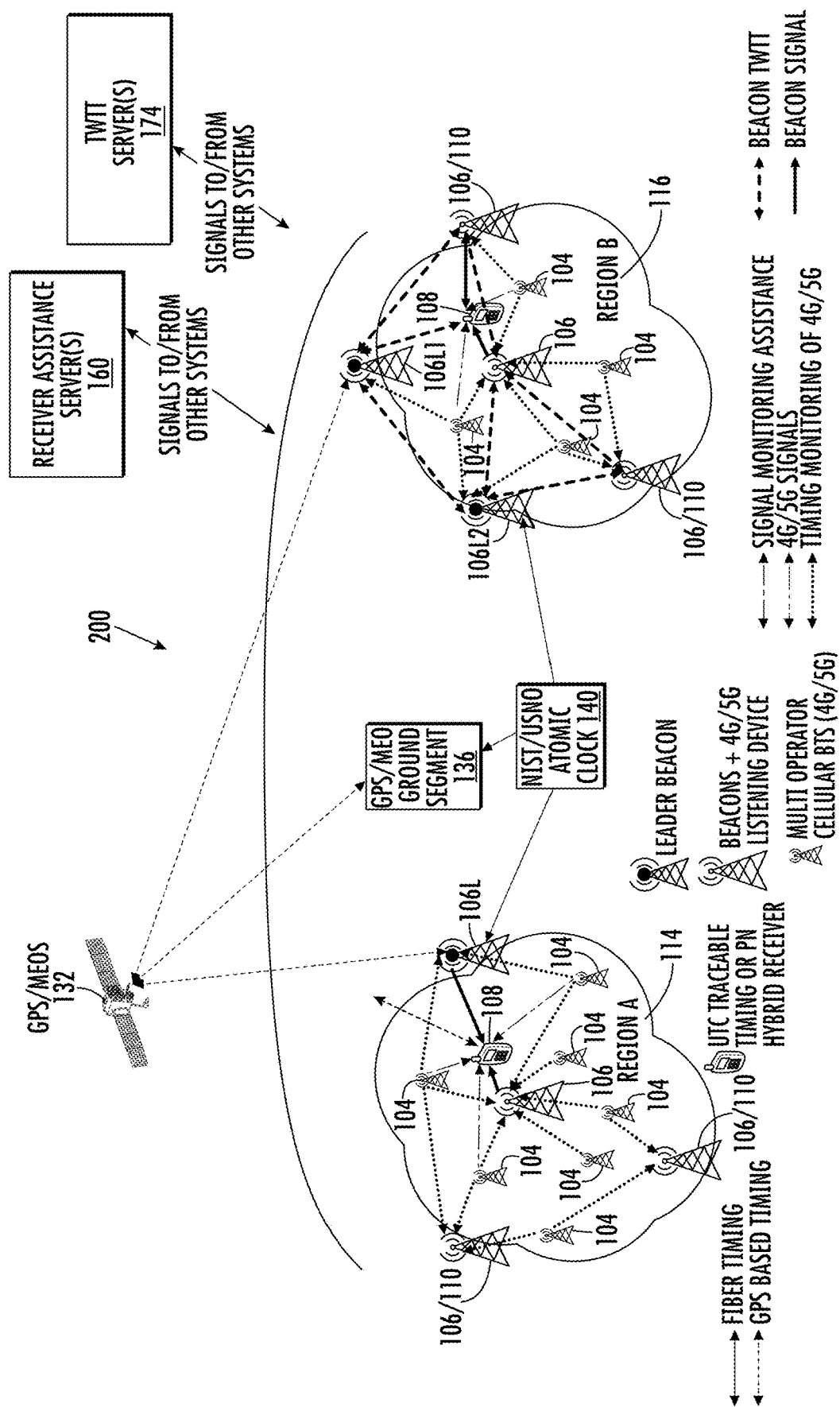
FIG. 2 is a simplified diagram of a high resiliency timing and PN system, in accordance with some embodiments.

FIG. 2 is a simplified diagram of a high resiliency timing and PN system 200, in accordance with some embodiments. The timing and PN system 200 has a hybridized architecture with cellular BTS 104 and terrestrial PNT beacons 106 (e.g., of the purpose-built terrestrial PNT system) for a subset network 114 within region A and subset network 116 within region B. The hybrid PNT system syncs SoOPs transmitted by the BTSs 104 to the common time scale, such as UTC of atomic clock 140, that is used by the terrestrial PNT beacons 106. The terrestrial PNT beacons 106 maintain their own time synchronization using a time transfer (e.g., two-way) time sync capability at each terrestrial PNT beacon 106 under control of a system timing controller. The system timing controller is a beacon time transfer and system timing controller which is referred to as a Two-Way Time Transfer (TWTT) server(s) 174 (described with reference to FIG. 3). The BTS sync errors are derived by listening devices 110. In this example, the listening devices 110 are co-located with the terrestrial PNT beacons 106 and receive signals from the BTS 104 in combination with the terrestrial PNT beacon 106 timing. In some embodiments, the listening devices 110 are co-located with some of the terrestrial PNT beacons 106 or with all of the terrestrial PNT beacons 106. Traceability to UTC by the atomic clock 140 and wireless distribution of time is achieved using the purpose-built terrestrial PNT system and cellular signals. Fill-in PNT beacons (of the purpose-built terrestrial PNT system) are optionally used where geometry is limited for PN performance. Mobile devices 108 can leverage cellular technology, for example, for the SoOPs. The hybrid solution in this example is based on the synchronization of the SoOPs and the multi-system approach.

Figure 3:
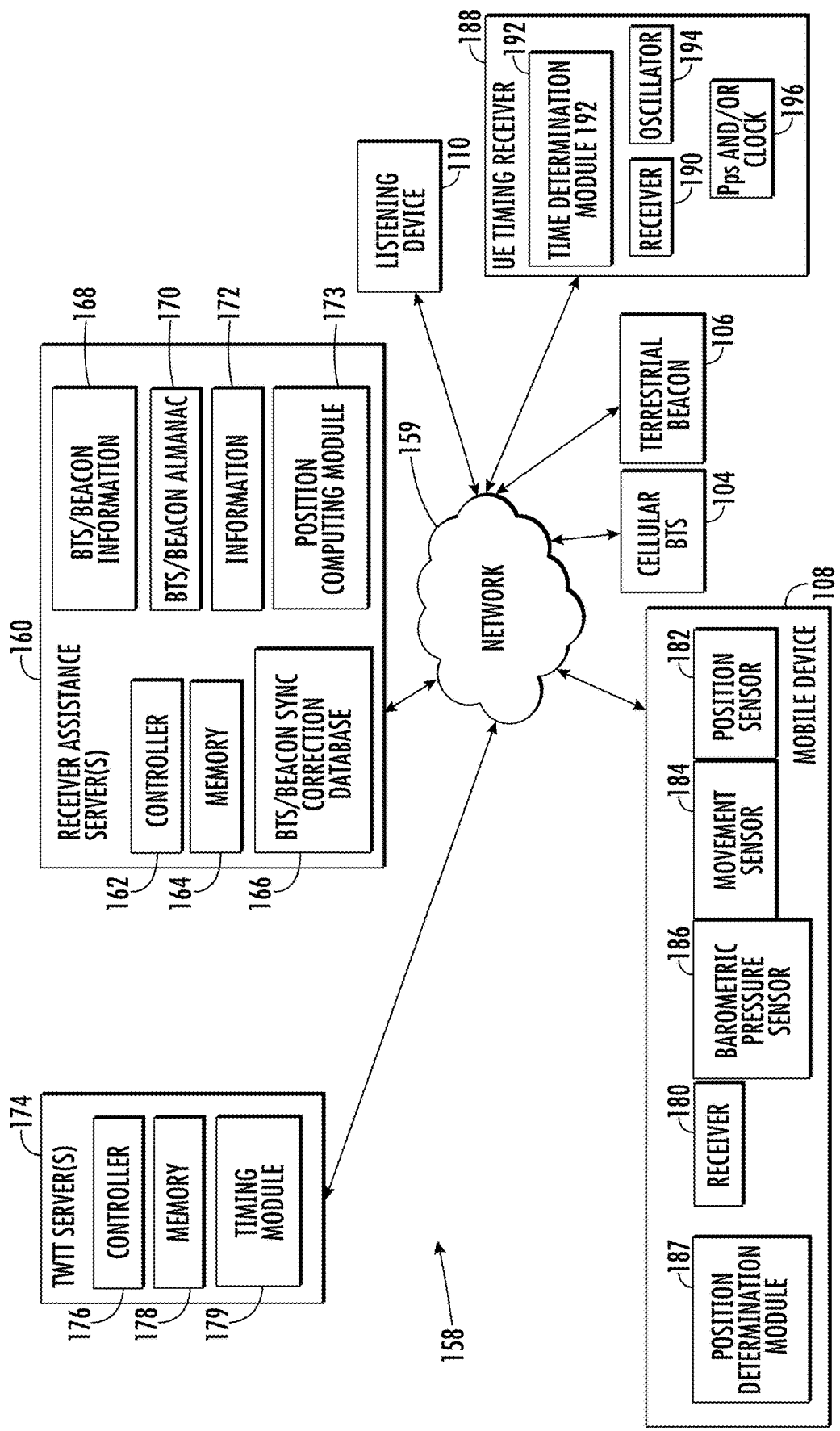
FIG. 3 is a schematic of a cloud computing environment, in accordance with some embodiments.

FIG. 3 is a schematic of a cloud computing environment, in accordance with some embodiments. The listening devices 110 (e.g., in this example, co-located with the terrestrial PNT beacon 106) are connected to a cloud computing environment 158. The listening devices 110 can determine a variety of information including synchronization error (time and frequency), coordinates of the SoOP, signal stability metrics, signal identity, or other SoOP network parameters. Communication in the cloud computing environment 158 is through a cloud network 159. The cloud network 159 generally represents any appropriate combination of the Internet, cell phone communication systems, broadband cellular networks, wide area networks (WANs), local area networks (LANs), wireless networks, networks based on the IEEE 802.11 family of standards (Wi-Fi networks), and other data communication networks. A cloud entity such as a receiver assistance server(s) 160 with a controller 162 and a memory 164 are provided. The cloud computing environment 158 creates, estimates, and maintains a BTS/beacon sync correction database 166 as well as other SoOP transmitter characteristics per relevant SoOP transmitter. The estimation of the sync correction database may involve measurements from the listening devices 110 as well as their coordinates and the BTS/beacon almanac 170. In the given example of the SoOPs being cellular signals, the sync error correction database includes sync error correction for the BTS 104 as well as BTS/beacon information 168.

In addition, a BTS/beacon almanac 170 (i.e., which could include BTS 104 coordinates, terrestrial PNT beacons 106 coordinates) is maintained at the receiver assistance server 160 or at another server. The BTS coordinates in the BTS/beacon almanac 170 could be obtained from an operator or determined, for example, by periodically driving or flying a vehicle, helicopter or drone in the area of interest. The receiver assistance server 160 may provide assistance to a receiver in the form of sync corrections as well as information 172 regarding the SoOP transmitters in the area as well as additional SoOP transmitter parameters such as signal stability metrics and signal identity. The receiver may be located at the listening device 110 or the mobile device 108.

The Two-way Time Transfer (TWTT) server 174 includes a controller 176, a memory 178 and a timing module 179. The TWTT server 174 manages the time transfer for synchronizing signals of the hybrid PNT system in order to determine a common time scale thereof in an optimal manner. More specifics regarding the operation and algorithms are discussed later. The timing module 179 communicates with the terrestrial PNT beacons 106 of the purpose-built terrestrial PNT system and receives time transfer measurements from each terrestrial PNT beacon 106 corresponding to all the other PNT beacons it can listen to/hear. Note that the terrestrial purpose built PNT beacon network is designed in a manner that maximizes the listening capability of the each PNT beacon to enable resiliency and redundancy. For example, the design may be done in such a manner that at least 2 or more beacons are hearable from every beacon to enable time transfer capability availability even in the case of a failure of a beacon. The timing module 179 computes time sync corrections for the terrestrial PNT beacons 106 that are transmitted back to the terrestrial PNT beacons 106 to control their timing, or to be used as timing corrections when using the terrestrial PNT beacons signals (using data packets transmitted by the beacons or by offline means, such as storage on a database, for example, in the BTS/beacon sync correction database 166, to the entity receiving the beacon signals). The terrestrial PNT beacons signals can be used by, for example, the listening devices 110 to derive timing.

Note that the entities BTS/beacon sync correction database 166, BTS/beacon information 168, BTS/beacon almanac 170, Information 172 can store information corresponding to the SoOP transmitters, the terrestrial PNT beacon transmitters. Also, the position computation module 173 can compute position using terrestrial beacon PNT measurements only or using both terrestrial PNT beacons and SoOP measurements. In the case of terrestrial PNT beacon transmitters, the almanac may be determined during installation since this beacon network is purpose built for location. Similarly, the Sync error for terrestrial PNT beacons correction in the BTS/beacon sync correction database 166 can all be zero if the sync error is corrected before beacon transmissions or non-zero if the sync corrections are not applied before beacon transmission.

In some embodiments, the PNT beacon and/or SoOP measurements are corrected for timing synchronization on the server in an UE-assisted computation system before position computation using, for example, a position computing module 173 within the receiver assistance server 160 which receives data (e.g., the SoOP measurements and measurements using the signals from the terrestrial PNT beacons 106 of the purpose-built terrestrial PNT system) from a receiver 180 of the mobile device 108. The position computing module 173 uses this measurement data along with sync corrections from the BTS/beacon sync correction database 166, BTS/beacon almanac 170, BTS/beacon information 168 and Information 172 to determine the location of the mobile device 108 and sends the location to the mobile device 108 or other cloud entities as per the application. In other embodiments, the timing synchronization corrections are corrected as part of a UE-based computation system on the mobile device 108. For example, the receiver assistance server 160 sends the timing correction data from the BTS/beacon sync correction database 166, BTS/beacon almanac 170, BTS/beacon information 168 and Information 172 to the mobile device 108 for the mobile device 108, and a position determination module 187 of the mobile device 108 computes its location based on the timing correction data, the SoOP measurements, and measurements from the signals from the terrestrial PNT beacons 106 of the purpose-built terrestrial PNT system. The computed position may be sent to other cloud or other entities depending on the application.

In some embodiments, each mobile device 108 generally includes the receiver 180, a position sensor 182, a movement sensor 184, a barometric pressure sensor 186, the position determination module 187, among other hardware, software, and data. The position sensor 182 generally represents one or more appropriate sensor devices and associated software for detecting a position of the mobile device 108, such as for a Global Navigation Satellite System (GNSS, such as GPS, GLONASS, Galileo, Compass/Beidou), a terrestrial PNT transmitter system, or a hybrid satellite/terrestrial PNT system, among others. The movement sensor 184 generally represents one or more appropriate sensor devices and associated software for detecting movement of the mobile device 108, such as an accelerometer, a gyroscope, a magnetometer/compass, and/or a pedometer, among others. The barometric pressure sensor 186 represents any appropriate sensor device that generates an atmospheric pressure measurement with which the mobile device 108 determines its altitude.

Figure 7:
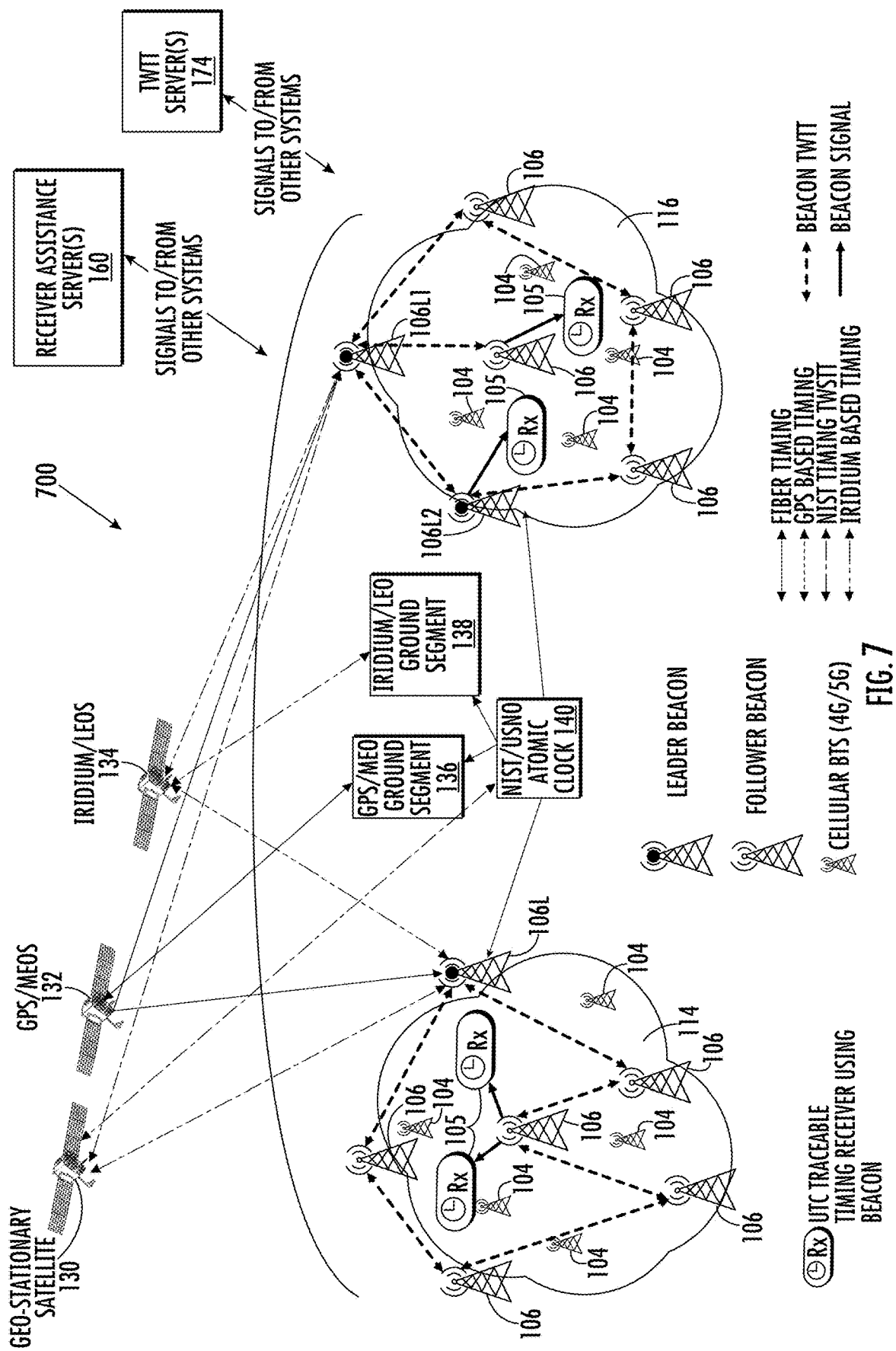
FIG. 7 is a simplified diagram of a purpose-built terrestrial PNT system having a UTC Timing Distribution Architecture using hybrid advanced location technology, in accordance with some embodiments.

In some embodiments, a user equipment (UE) timing receiver 188 (as shown in FIGS. 1, 3 and 7) may be implemented to enable accurate timing and synchronizing the reception and processing of signals such as by computing position or providing timing information. The UE timing receiver 188 may be an indoor timing receiver used, for example, in the financial or banking industry. The UE timing receiver 188 includes a receiver 190 that receives signals such as SoOP and, optionally, terrestrial beacon signals. A time determination module 192 is configured to estimate the common scale time using TOA measurements. An oscillator 194 and optionally, an output pulse-per-second signal and an output disciplined clock 196 (e.g., 10 MHz frequency synchronized to the SoOP/terrestrial beacon system), among other hardware, software, and data may also be included.

Figure 4:
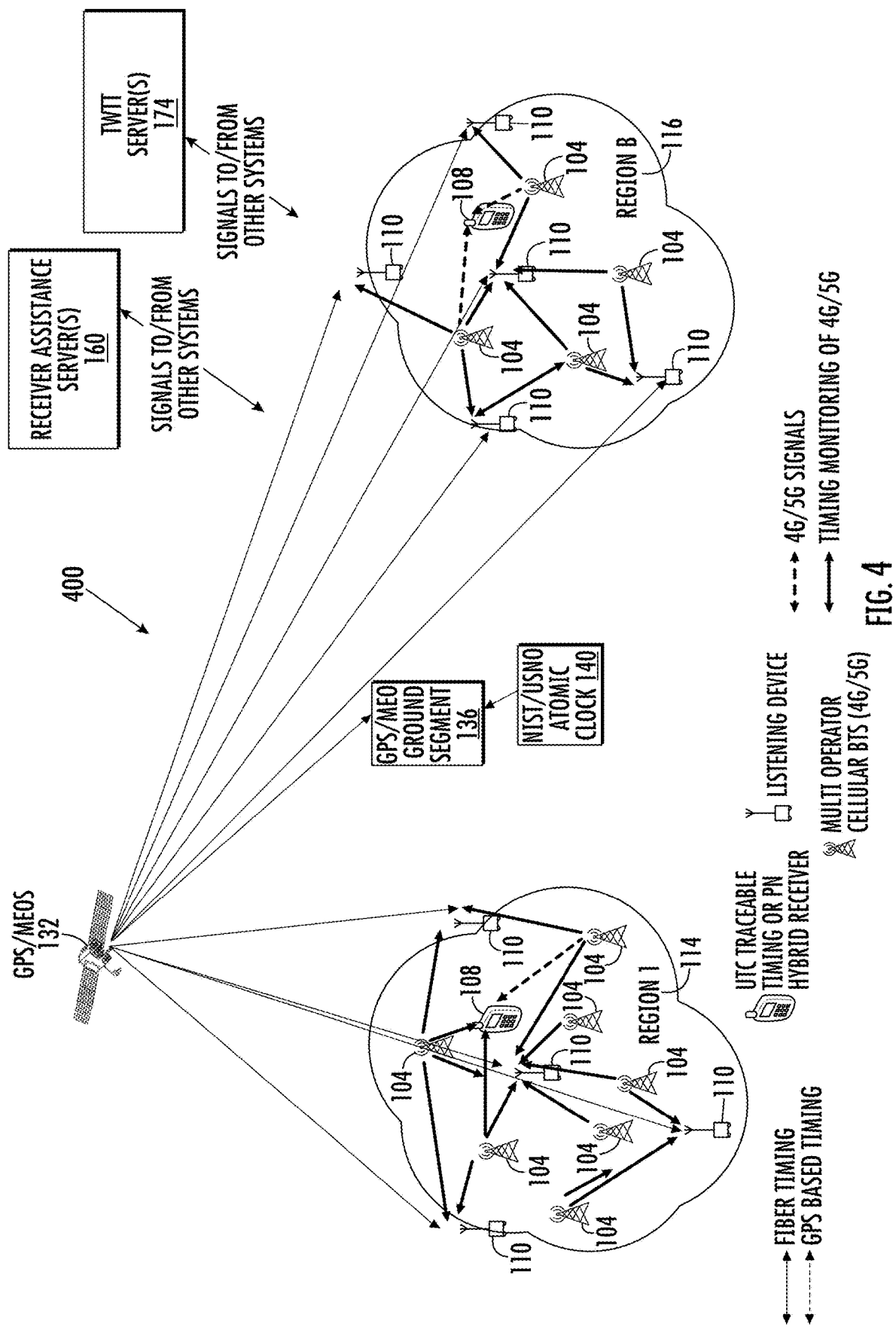
FIG. 4 is a simplified diagram of a basic resilient timing and PN system, in accordance with some embodiments.

FIG. 4 is a simplified diagram of a basic resilient timing and PN system 400, in accordance with some embodiments, having a hybridized architecture with cellular beacons from one or more BTS 104 and listening devices 110. Some embodiments using only one or more SoOPs along with the listening devices 110 can be used to provide a basic resilient timing system with one or more SoOP systems. Such a system generally does not require dedicated spectrum since it does not use signals from a purpose-built terrestrial PNT system.

In some embodiments, subset networks 114 monitors region A and subset network 116 monitors region B. The listening devices 110 may be a standalone listening device with multi-operator cellular (e.g., LTE) receiver and a timing module. In some embodiments, a multi-operator multi-band cellular receiver in a listening device 110 is used to receive signals from cellular BTS 104 transmissions. Additionally, a timing module may include a GPS (or GNSS)-disciplined atomic clock 140 (based on a timing module in a terrestrial PNT beacon of the purpose-built terrestrial PNT system) or other time source traceable to UTC time such as fiber-based timing, LEO satellites. An example of a terrestrial PNT beacon system is shown in U.S. Pat. No. 8,629,803, which issued on Jan. 14, 2014, is assigned in common with the present application, and is incorporated by reference as if fully set forth herein. U.S. Pat. No. 8,629,803 discloses terrestrial PNT beacon timing and transmitting sync corrections by the terrestrial beacon system.

In some embodiments, the network of such listening device-based systems creates wireless timing distribution system over a cellular coverage area such as region A and region B by determining and deriving corrections for the cellular signals. Using an atomic clock within the listening device achieves resiliency in the form of holdover of about 1 day with less than 1 µs of drift, for example, during a GPS (or GNSS) outage. Additionally, this may use a resilient GPS (or GNSS) unit with jammer and spoof detection capability to detect and stop disciplining the atomic clock during jammer or spoofing induced outages.

In some embodiments, a timing receiver of the basic resiliency timing system enables wireless delivery of time synchronization information. By listening to all operator cellular (e.g., 3G/4G/5G) signals (or other SoOPs), the timing receiver of the listening device 110 determines the TOA of these signals, applies sync error correction using a timing assistance feed (which uses a side channel for network communication with the user-equipment receiver) from the receiver assistance server 160, and then in some embodiments, chooses the earliest arriving BTS signal to determine a time estimate. Different oscillator variants may be used depending on the target application. For example, a Temperature-Compensated Crystal Oscillator (TCXO) may provide (a low-cost option and an Oven-Controlled Crystal Oscillator (OCXO) may provide a higher-cost option, depending on the stability and cost tradeoffs. Additionally, some embodiments, the timing receiver of the listening device 110 may provide a pulse per second (PPS) subsystem and optionally a clock as output.

In some embodiments, such a system can deliver UTC timing wirelessly within 1 µs after 1 day, for example, of GPS/GNSS outage. Performance of the system with respect to sync error source is affected by the listening device 110 placement. For example, placement of listening device 110 within an environment where the TOA is affected by the surrounding building and/or vegetation blockage and/or reflection from nearby buildings/obstacles affects the quality of the sync error estimation. Additionally, the obtainable accuracy is determined by whether the channel between the listening device 110 and the BTS 104 is non-line-of-sight (NLOS) as well as the nature of multipath in the channel.

In some embodiments, a basic resilient timing and PN system may include different variants. In a first variant (e.g., BRTS-var1), the coordinates of the BTS 104 are unknown, so many listening devices 110 are required to be used to monitor the SoOPs and determine the coordinates of the BTSs 104 thereof (which could change) through reverse trilateration.

In a second variant (e.g., BRTS-var2), the coordinates of the BTS 104 are unknown, but fewer listening devices 110 (fewer than in the first variant, BRTS-var1) are used only to find the sync error. Additionally, a vehicle, helicopter or drone is periodically driven or flown in the area of interest to determine the coordinates of the BTS 104 with known position truth (such as from GPS) during these drives or flights. Furthermore, checks are maintained through listening devices 110 for any BTS 104 parameters including movement, signal identity configuration changes (such as cell ID changes), signal quality etc.

In a third variant (e.g., BRTS-var3), the coordinates of the BTS 104 are known, and an arrangement with cellular operators is needed to access a BTS almanac. Additionally, a few listening devices 110 are used to monitor and maintain system parameters. Some drawbacks of this variant involve inaccuracies in the BTS coordinates.

In some embodiments, the preceding variants such as BRTS-var1, BRTS-var2, and BRTS-var3, use SoOP signals and listening devices. In addition, placing some listening devices 110 at high-elevation sites can reduce the needed listening device count and provide better timing sync performance (for example, required for PN) of the hybrid PNT system. Also, in some embodiments, listening devices 110 should be non-co-located with the cellular BTS antennas to obtain a minimum listening device count. Additionally, the quality of timing is a function of listening device cellular antenna location (LOS signal availability) and GPS antenna position. Furthermore, the listening device count is generally a function of listening device antenna height and the ability of receivers to perform deep scans to detect signals and estimate TOA/frequency accurately (for e.g., through long integration).

Additionally, the variants such as BRTS-var1, BRTS-var2, and BRTS-var3 can also be implemented using the purpose-built terrestrial PNT system. Some embodiments involve a high resiliency or robust timing system that is traceable to UTC from the atomic clock 140 and does not make use of GPS/GNSS. The robustness and reliability of the timing capability of the purpose-built terrestrial PNT system added to the SoOP provides traceability to a GPS-free UTC. The wireless signals and network of the purpose-built terrestrial PNT system are used to transfer UTC time to all of the beacons in a given market area. Such a system includes a leader device with a GPS-free UTC source and leader/follower devices with Two-Way Time Transfer (TWTT) capabilities. Additionally, special multi-operator multi-band cellular (e.g., LTE) receivers are used in the listening devices to receive signals from cellular (e.g., LTE) BTS transmissions. Also, the system uses PNT beacons of the purpose-built terrestrial PNT system that include time-transfer technology.

Figure 5:
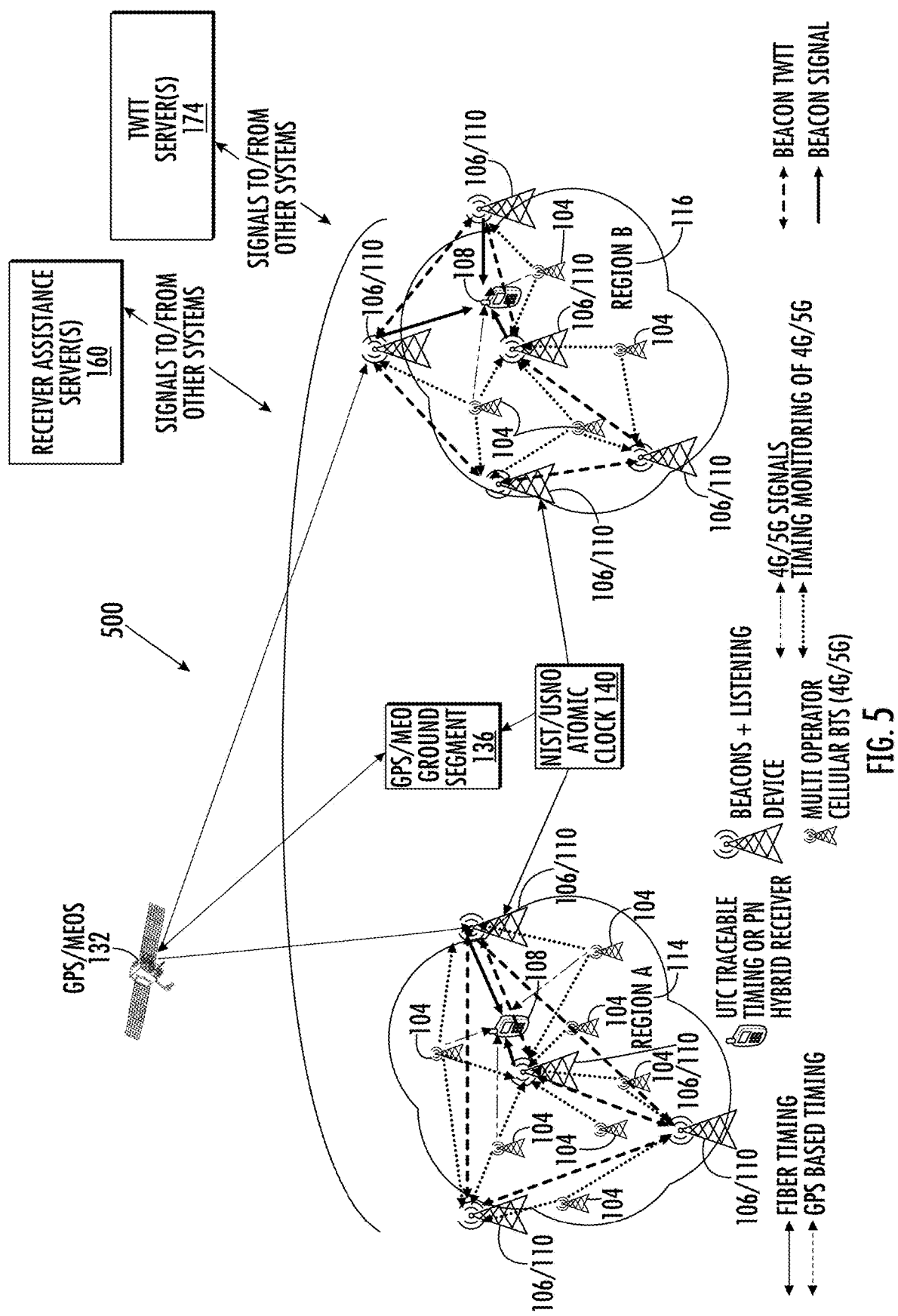
FIG. 5 is a simplified diagram of a first embodiment of a highly resilient timing and PN system, in accordance with some embodiments.
Figure 6:
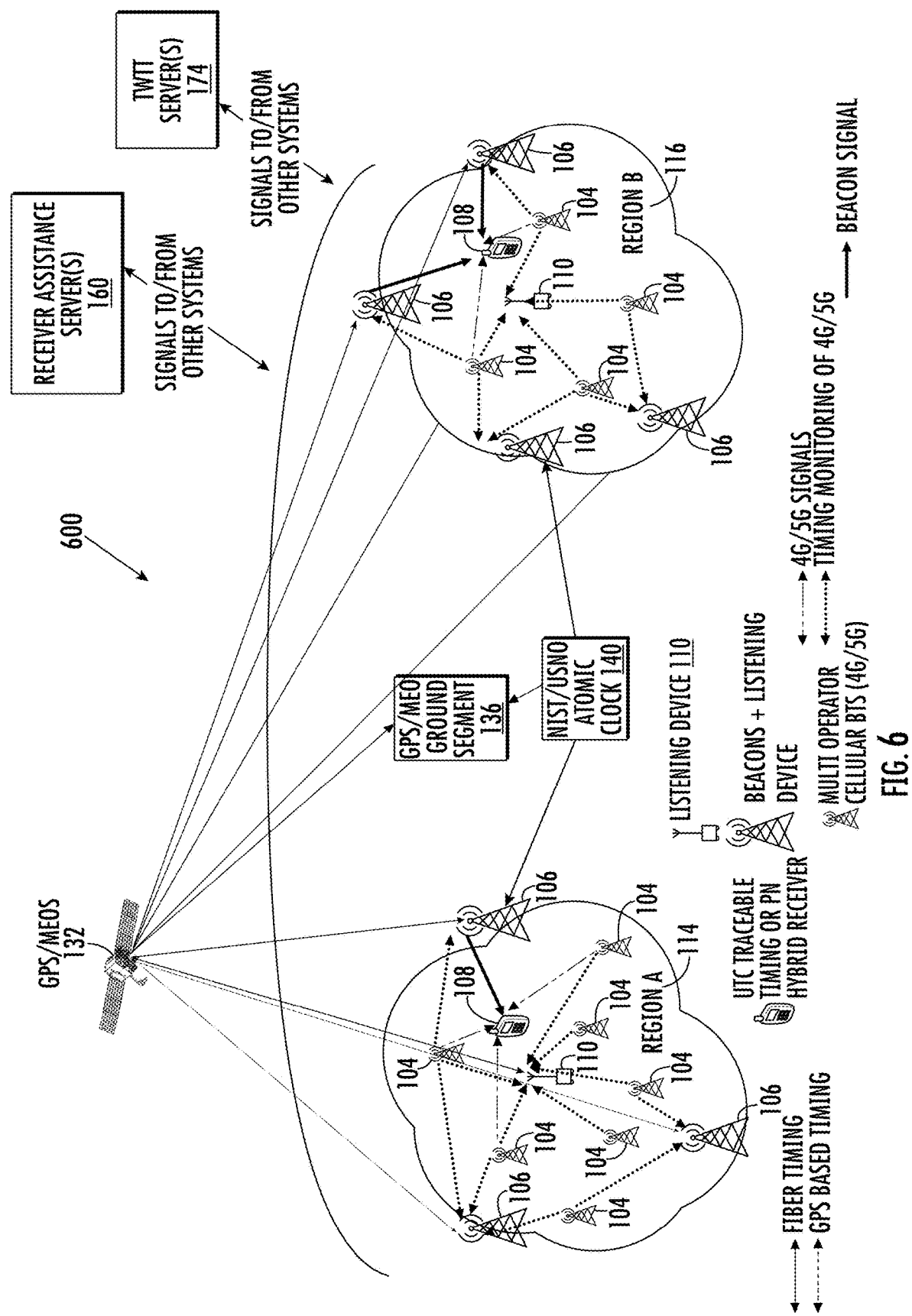
FIG. 6 is a simplified diagram of a second embodiment of a highly resilient timing and PN system, in accordance with some embodiments.

As described with reference to FIG. 2, in some embodiments, the highly resilient timing and PN system may have a hybridized architecture that includes cellular BTS stations and terrestrial PNT beacons, having co-located listening devices, of the purpose-built terrestrial PNT system. FIG. 5 is a simplified diagram of a highly resilient timing and PN system 500, and FIG. 6 is a simplified diagram of a highly resilient timing and PN system 600, both in accordance with some embodiments. An example disclosure of time transfer techniques is shown in U.S. Pat. No. 9,967,845, which issued on May 8, 2018, is assigned in common with the present application, and is incorporated by reference as if fully set forth herein. Another example disclosure of time transfer techniques is shown in U.S. Pat. No. 10,231,201, which issued on Mar. 12, 2019, is assigned in common with the present application, and is incorporated by reference as if fully set forth herein.

Referring to FIG. 5, the timing and PN system 500, in some embodiments, include the listening devices 110 which may be a Type 0 SMU co-located with a terrestrial PNT beacon. The Type 0 SMU uses a beacon co-located listening device with a multi-operator cellular receiver and derives timing from the co-located beacon timing system. The sync of the terrestrial PNT beacons 106 of the purpose-built terrestrial PNT system is maintained through TWTT (described in more detail below) and leader-follower topology to maintain UTC at each terrestrial PNT beacon 106. The listening devices 110 are able to derive BTS timing/frequency offsets using measurements of BTS signals and the timescale from local PNT beacon timing. The listening devices 110 determine the coordinates of the BTS 104 as described in BRTS-var1. Such a system might require many terrestrial beacons 106 of the purpose-built terrestrial PNT system due to the listening device 110 requirements for BTS coordinate determination. However, this variant could be combined with the second (BRTS-var2) or third variants (BRTS-var2) of a basic resilient timing and PN system described above which have lesser or fewer listening device 110 (and, therefore, also lesser terrestrial beacons 106) requirements.

Referring to FIG. 6, the timing and PN system 600 has a hybridized architecture with cellular BTS stations and terrestrial PNT beacons of the purpose-built terrestrial PNT system that are not necessarily co-located with the listening devices 110. The listening device 110 may be a Type 2 SMU (i.e., standalone listening device) or Type 0 SMU (i.e., listening device co-located with terrestrial PNT beacon). The Type 2 SMU is a standalone listening device with a multi-operator cellular receiver, a timing module, and the receive capability of the terrestrial PNT beacons 106 of the purpose-built terrestrial PNT system.

In this system, the timing sync of the terrestrial PNT beacons 106 of the purpose-built terrestrial PNT system is maintained through TWTT and a leader-follower topology to maintain UTC at each terrestrial PNT beacon 106. Also, the listening device 110 (including a multi-operator cellular receiver, optional GPS receiver, atomic clock, and a timing receiver of the terrestrial PNT beacons 106 of the purpose-built terrestrial PNT system) is able to derive BTS timing offsets using one-way time transfer ((TT), which is described below) from the terrestrial PNT beacons 106 by comparing BTS timing with that based on signals from the terrestrial PNT beacons 106. An advantage of such a system is that the listening devices 110 locations and locations of the terrestrial PNT beacons 106 of the purpose-built terrestrial PNT system are de-coupled, which helps since the terrestrial PNT network design beacon (e.g. spacing for trilateration coverage and performance of receiver) is generally based on different requirements (e.g. driven by sensitivity link budgets and multipath) than the network design (e.g. spacing for hear-ability coverage and performance) and spacing of the listening device (e.g. driven by capability of hearing BTS). However, a potential drawback of such a system is that one-way TT to listening devices cannot overcome a time-varying multipath like TWTT can, but it is possible to improve one-way TT by using short term knowledge of an accurate time base.

In some embodiments, for more accurate TT between terrestrial PNT beacons 106 and the listening devices, the listening devices are operable to perform TWTT or one-way TT, with occasionally accessing UTC time base availability from a different timing source, with respect to a terrestrial PNT beacons 106. In one-way TT, if the multipath delays are relatively stable across time, then multipath related TOA biases can be calibrated when the UTC time scale is available occasionally from GPS/GNSS or other sources. Furthermore, the highly resilient timing system could work with a small or sparse network of the purpose-built terrestrial PNT system. Also, when the spectrum of the purpose-built terrestrial PNT system is available in a given region, then the resiliency add-on of using the purpose-built terrestrial PNT system can achieve the highly resilient timing system in addition to the basic resilient timing and PN system described above. In addition, the performance of the basic resilient timing and PN system can also be obtained using the network of the purpose-built PNT system for the high resilient timing system. However, the PN performance of such a system may be limited in areas where geometry or line-of-sight (LOS) multi-path limits ranging performance.

In some embodiments, a highly resilient, high-performance PN solution involves network improvements beyond a basic PN solution. Terrestrial PNT beacons 106 of the purpose-built terrestrial PNT system are added to the SoOPs for improved geometry and LOS to the mobile device for greater positioning accuracy. Such embodiments, for example, can be used to target specific desired areas of coverage, such as vertiports, flight paths, and highways, among others. Additionally, listening device timing sync estimation accuracy can be improved by a bi-directional transmission using TWTT with respect to the SoOP emitter. In a 4G/5G cellular system, for example, RTT measurements can be initiated and executed using standard call flows (e.g., using PRS on downlink and SRS on uplink) for executing TWTT. Although it is one way to achieve accurate TT, RTT generally has potential drawbacks, e.g., it requires the listening device to be active (as opposed to passive, i.e., listen-only), which increases the cost of deployment of such a system. Also, the SoOP needs to be a bi-directional system with time stamping capability at the SoOP emitter to perform RTT and TWTT, and the listening device needs bidirectional links to each SoOP emitter and needs to use uplink bandwidth. Furthermore, the quality of TWTT depends on the reciprocity of the transmission channel, and Time Division Duplex (TDD) channels have better reciprocity than Frequency Division Duplex (FDD) channels.

FIG. 7 is a simplified diagram of the purpose-built terrestrial PNT system 700 having a UTC Timing Distribution Architecture to facilitate using the hybrid advanced location technology described herein, in accordance with some embodiments. In this example, the terrestrial PNT system 700 includes one or more leader terrestrial beacons 106L (or 106L1 and 106L2) and follower terrestrial beacons 106. The leader has access to a common time scale (e.g., UTC) through fiber optic timing, GPS-based timing, NIST timing TWSTT, and Iridium-based timing.

UTC timing is commonly derived from Medium Earth Orbit Satellite (MEOS) systems. For example, the GPS constellation is a MEOS system and provides global coverage. Since GPS-based timing is satellite based, it can potentially be jammed due to the low signal levels it uses. Therefore, an indoor distribution requires an antenna drop. An alternative is to use Low Earth Orbit Satellite (LEOS) systems 134. For example, the Iridium satellite constellation is a LEOS system 134 and provides satellite-based timing distribution with global coverage. The signals from these satellites can still potentially be jammed, so an antenna is required for unconstrained deployment deep indoors. Another alternative, therefore, is to use fiber optic cables to distribute timing. This can be made with relatively high reliability but also at a relatively high cost. Also, area coverage is limited by the availability of the fiber network.

Furthermore, it is expensive to distribute signals to the "last mile" indoors using fiber optic cables.

In some embodiments, therefore, UTC traceable wireless timing distribution uses a leader-follower network system of the purpose-built terrestrial PNT system. This approach provides reliable independent UTC timing on the common time scale to a few of the terrestrial PNT beacons 106 (of the purpose-built terrestrial PNT system) per coverage area, market, or geographic area from a resilient combination of GPS/MEOS 132, LEOS/Iridium 134, TWSTT from NIST, and fiber-based timing tied to NIST/USNO with optional Cesium holdover. In some embodiments, there is a terrestrial PNT beacon 106 called "leader". TWTT technology (described below) is then used to transfer the timing data from the leader terrestrial PNT beacons 106L to other terrestrial beacons 106 (i.e., "followers") in the coverage area such as region A and region B. The timing is distributed from the leader terrestrial PNT beacons 106L using wireless network signals of the purpose-built terrestrial PNT system. Thus, the timing receivers including listening devices in the coverage areas of region A and region B can receive the timing data wirelessly.

Figure 8:
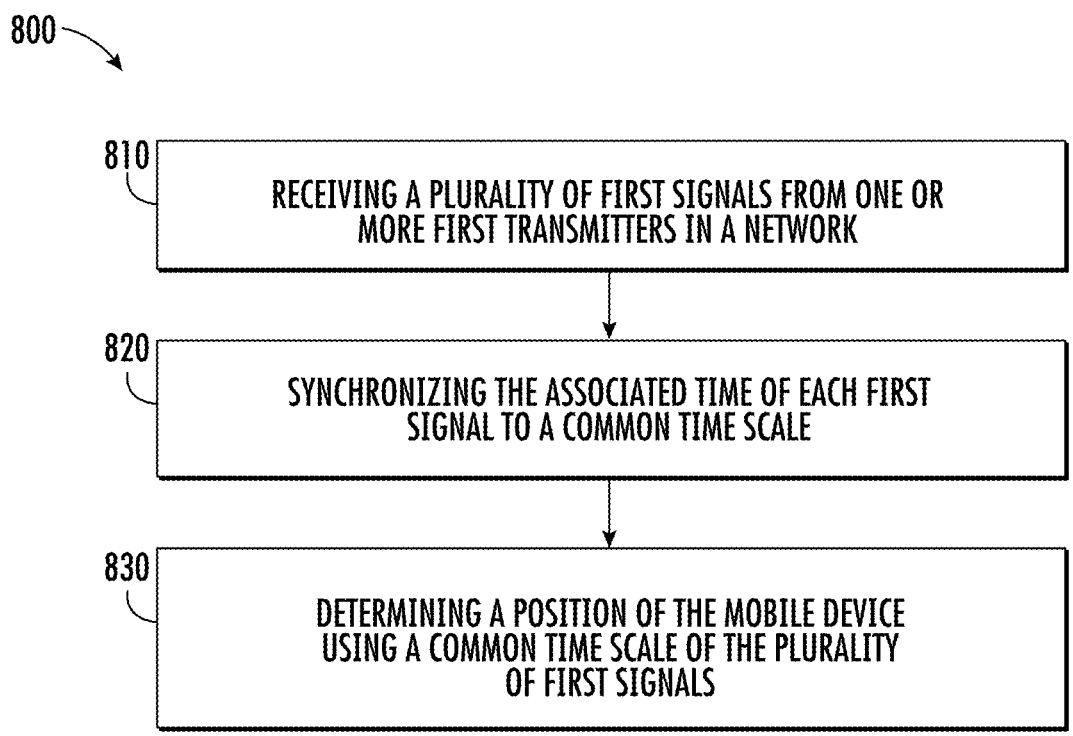
FIG. 8 is a flowchart for a method for determining a position of the mobile device, in accordance with some embodiments.

Several architectures of systems for determining a position of the mobile device are disclosed herein. A system may use one or more signals of opportunity (SoOP) to form a PNT system for determining the location of a mobile device. FIG. 8 is a flowchart for a method 800 for determining a position of the mobile device, in accordance with some embodiments. The particular steps, order of steps, and combination of steps are shown for illustrative and explanatory purposes only. Other embodiments can implement different particular steps, orders of steps, and combinations of steps to achieve similar functions or results.

For example, a method 800 may be implemented for a system implementing PNT using only SoOps. Method 800 includes, at block 810, a mobile device receiving a plurality of first signals from one or more first transmitters in a network. Each first signal has first data including an associated time that is non-synchronized to the time of another first signal of the plurality of first signals. In this context, non-synchronized means that the associated time of each first signal is based on a local time scale that is different from a common time scale. Generally, the common time scale is UTC so put another way, the local time scale is not UTC. The plurality of first signals is generated from a system including a cellular (3G/4G/5G) deployment, WiFi transmitter, Bluetooth transmitter, digital TV, a system that broadcasts digital signals with timing information, or a combination thereof. The plurality of first signals is a terrestrial or satellite-based wireless signal of a non-location-based system that can be used to determine range, pseudorange, or time of arrival (TOA) along with associated quality metrics for those measurements.

At block 820, one or more processors synchronizes the associated time of each first signal to a common time scale. In some embodiments, the common time scale is Coordinated Universal Time (UTC). In some embodiments, the one or more processors determining the position of the mobile device is in the mobile device. In other embodiments, the one or more processors determining the position of the mobile device is at a server. At block 830, one or more processors determines the position of the mobile device using the common time scale of the plurality of first signals.

In some embodiments, one or more processors determines parameters of the first signal. The parameters include a first transmitter identification, a first transmitter position, and first transmitter characteristics. In addition to using the common time scale, at least a portion of these parameters are used to determine the position of the mobile device.

Figure 9A:
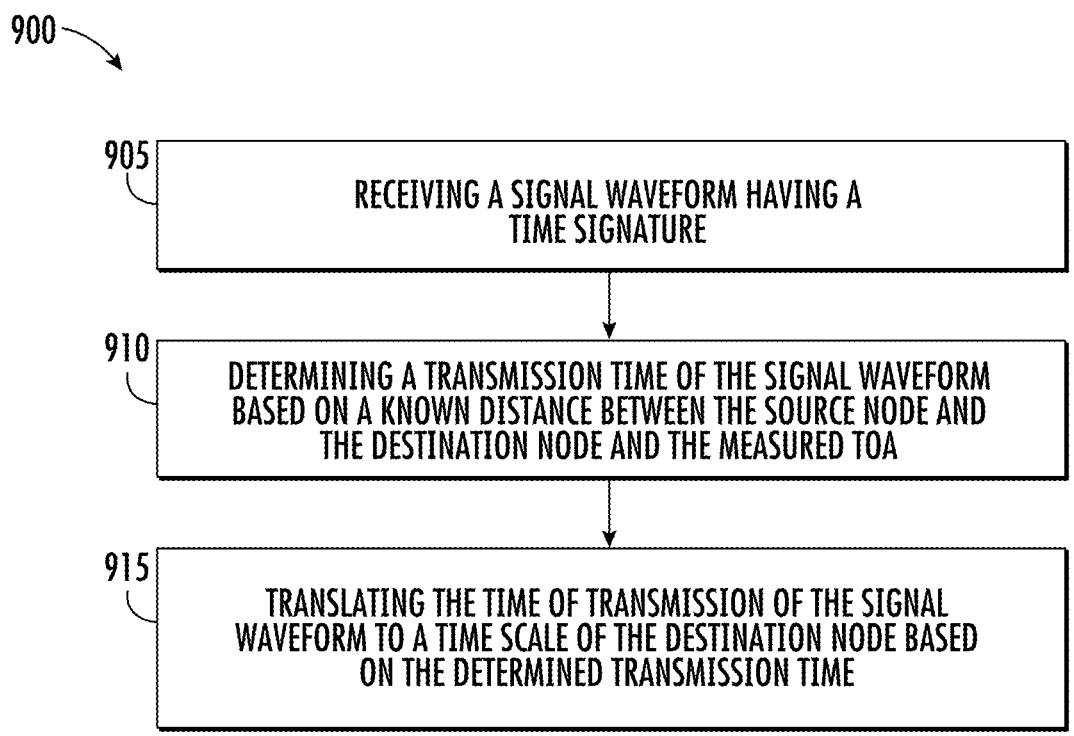
FIG. 9A is a flowchart for a method for synchronizing the associated time of each first signal to a common time scale, in accordance with some embodiments.

FIG. 9A is a flowchart for a method 900 for synchronizing the associated time of each first signal to a common time scale, in accordance with some embodiments. The particular steps, order of steps, and combination of steps are shown for illustrative and explanatory purposes only. Other embodiments can implement different particular steps, orders of steps, and combinations of steps to achieve similar functions or results. This may be implemented, for example, with the method 800.

A method 900 includes, at block 905, a receiver of a listening device at a destination node receives a signal waveform having a time signature from a first transmitter of the one or more first transmitters at a source node. The time signature is pre-defined points on the signal waveform that are transmitted at specific times relative to a local time scale. The receiver measures the time of arrival (TOA) of the pre-defined points on the signal waveform. At block 910, a transmission time of the signal waveform based on a known distance between the source node and the destination node and the measured TOA is determined. At block 915, the time of transmission of the signal waveform is translated to a time scale of the destination node based on the determined transmission time.

In addition to using the SoOp described in method 800, the system may further include a purpose-built terrestrial PNT system combined with one or more SoOPs to form a hybrid PNT system for determining the location of a mobile device. For this configuration, the method 800 further includes receiving, by the mobile device, a plurality of second signals from one or more second transmitters in the network. Each second signal having second data including an associated time that is based on the common time scale. The common time scale is Coordinated Universal Time (UTC). In some embodiments, the one or more second transmitters are a purpose-built PNT beacon of a terrestrial Positioning, Navigation, and Timing (PNT) system. The synchronizing includes one or more processors synchronizing the associated time of each second signal and the associated time of each first signal to the common time scale. The determining comprises one or more processors determining the position of the mobile device using the common time scale of the plurality of first signals and the common time scale of the plurality of second signals. In other embodiments, the plurality of first signals is received at a plurality of listening devices. The plurality of listening devices is configured to listen to the plurality of first signals and have access to a common time scale. The plurality of listening devices transmits to one or more processors, an indication of the first data including the associated times of the received plurality of first signals. The one or more processors generate timing correction data from the one or more processors to synchronize the associated time of each first signal to a common time scale.

Figure 9B:
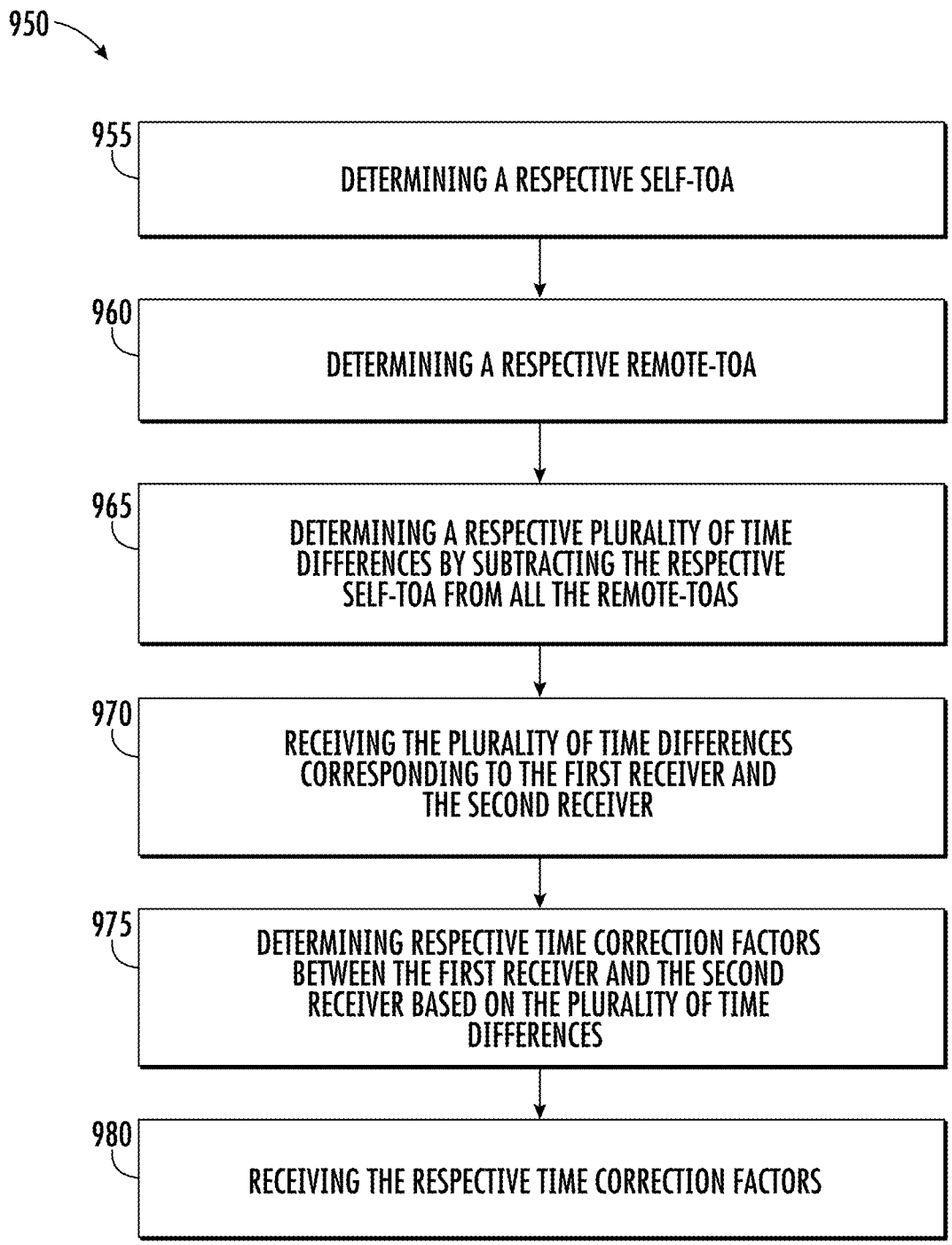
FIG. 9B is a flowchart for a method for synchronizing the associated time of each second signal and the associated time of each first signal to the common time scale, in accordance with some embodiments.

FIG. 9B is a flowchart for a method for synchronizing the associated time of each second signal and the associated time of each first signal to the common time scale, in accordance with some embodiments. The particular steps, order of steps, and combination of steps are shown for illustrative and explanatory purposes only. Other embodiments can implement different particular steps, orders of steps, and combinations of steps to achieve similar functions or results. In the hybrid PNT system, one or more second transmitters are nodes in the PNT network. Each transmitter of the one or more second transmitters includes a respective receiver. A first transmitter of the second transmitters is designated as a first node, and a second transmitter of the second transmitters is designated as a second node.

In some embodiments, the mobile device receives a plurality of second signals from one or more second transmitters in the network. Each second signal has second data including an associated time that is based on the common time scale. A method 950 for time synchronizing includes, at block 955, a first receiver of the first node and a second receiver of the second node, determines a respective self-TOA. The self-TOA is the time of arrival (TOA) of the signal waveform transmitted by the same node. At block 960, the first receiver and the second receiver determine a respective remote-TOA. The remote-TOA is the time of arrival (TOA) of the signal waveform transmitted by the other nodes that is not itself. At block 965, the first receiver and the second receiver determine a respective plurality of time differences by subtracting the respective self-TOA from all the remote-TOAs. At block 970, the one or more processors receive the plurality of time differences corresponding to the first receiver and the second receiver. At block 975, the one or more processors determine respective time correction factors between the first receiver and the second receiver based on the plurality of time differences. At block 980, the first receiver and the second receiver receive the respective time correction factors. The first receiver and the second receiver use the received time correction factors to synchronize a respective clock at the receiver to the common time scale. This synchronizing is described more in subsequent sections.

In some embodiments, a hybrid system may use one or more SoOPs with listening devices for determining the location of a mobile device. For this system, synchronizing the respective time of each first signal to a common time scale may include receiving the plurality of first signals at a plurality of listening devices. The plurality of listening devices is configured to listen to the plurality of first signals and have access to a common time scale. The plurality of listening devices transmit to one or more processors, an indication of the first data including the associated times of the received plurality of first signals. One or more processors receive timing correction data to synchronize the associated time of each first signal to a common time scale from the one or more processors.

In some embodiments, a hybrid system may use one or more SoOPs with listening devices for determining the location of a mobile device. For this system, synchronizing the respective time of each first signal to a common time scale may include receiving an indication of the common time scale from another listening device. The plurality of first signals is received at the listening device. One or more processors synchronize the associated time of each first signal to the common time scale using the received indication of the common time scale.

In some embodiments, a hybrid system may use one or more SoOPs with listening devices for determining the location of a mobile device. For this system, synchronizing the associated time of each first signal to a common time scale may include receiving a plurality of second signals from one or more second transmitters in the network by a listening device. Each second signal has second data including an associated time that is based on the common time scale. The plurality of first signals are received at a plurality of listening devices, where the plurality of listening devices are configured to listen to the plurality of first signals. One or more processors synchronize the associated time of each first signal to the common time scale using the second signals.

In some embodiments, the listening device is a first listening device, and the synchronizing comprises the first listening device receiving a signal waveform having a time signature from a transmitter having a known location. The time signature is pre-defined points on the waveform that are transmitted at specific times relative to a local time scale. The listening device measures the time of arrival (TOA) of the pre-defined points on the signal waveform. A second listening device receives the signal waveform. The first listening device and the second listening device exchange the time of arrival (TOA) measurements of the signal waveform on the respective local time scales. Time corrections for the respective local time scale of the first listening device and the second listening device relative to an arbitrary common time scale are determined. The determining uses the TOA at first and second listening devices, a time corresponding to a distance between the transmitter and the first listening device, and a time corresponding to a distance between the transmitter and the second listening device.

Embodiments for accurate one-way time transfer may involve a method for transferring time one-way accurately from a source (transmitter) node at a known location in a network to a destination (receiver) node at a second known location in the network using wireless signals. The source node in the network is equipped with a transmitter that transmits signals with a waveform having a time signature (i.e., pre-defined points on the waveform which are transmitted at specific times relative to a local time scale) from an antenna over the air. Additionally, the destination node is equipped with a receiver of that waveform that can measure the time of arrival (TOA) (i.e., the pre-defined points in the signal waveform) of the signal received from the source node. Based on the TOA at the destination and known coordinates of the antennas of the source node and the destination node, therefore, the time of transmission at the source node can be translated to the time scale of the destination node, thus achieving one-way time transfer or a relationship between the time scales at the source node and the destination node.

A time scale can generally be thought of as a counter based on a local clock. The local clock can be disciplined or not disciplined (i.e., free running) during different intervals by a source of timing (e.g., GPS/GNSS, LEO satellites, TWSTT satellite signals, etc.). In a clean channel, in the absence of multipath-induced-delays and fading, an accurate one-way time transfer can be achieved without error if the delays of the signals provided to the antennas can be correctly calibrated. However, the wireless channel may be affected by multipath, which can lead to an error in the one-way time transfer.

A method of improving one-way time transfer accuracy mitigates (cancels or reduces) such multipath error when the source and destination nodes have access to a stable time source during certain intervals of time, although not always. In one example, a common time scale may be available at the source and destination nodes in certain intervals of time, where the time scale may be derived using a common signal or clock available to both nodes (such as GPS or LEO satellites), which have timing embedded in them, so that the local clock can be disciplined using the signal or clock. In another example, one of the nodes may derive a time scale from a stable source, such as fiber optic signals or a Cesium timing source, whereas another may receive timing from a timing source, which may not be of good quality (i.e., not stable) at all times (for example, in the case of GPS, due to blockage of signals or multipath at the GPS antenna due to constraints in GPS antenna placement/environment or GPS jamming/spoofing).

On the other hand, if a good quality (i.e., stable) and accurate time scale is always available to both the source node and the destination node, then there is no need for any time transfer between the nodes. However, when a good quality and accurate time scale is not always available to the source and destination nodes, then time transfer might be required. Also, time transfer might be required when the time scale quality is not good at both the source and destination nodes simultaneously (e.g., due to GPS outages). If a timing source with stable clock model parameters (such as frequency offset, and drift) is available at the source node and used as the local time scale, then the source time scale can be translated to the time duration when the destination time scale is accurate.

At the destination node, the time of reception (TOR) minus the distance from source to destination divided by the speed of light equals the Time of Transmit (TOT) calculated, i.e., TOTcalc=TOR−distance. In some embodiments, the TOR can be estimated using a single TOA or using a statistic (e.g., a central tendency, such as a mean or median value) derived using a set of TOAs.

The actual TOT (TOTactual) should be taken from the destination node time scale as the true transmit time, when that destination scale is known to be accurate.

The multipath bias MP can be estimated as MP=TOTcalc−TOTactual. Then the estimated MP can be applied to TOTcalc' during other times when the time scale may not be accurate to get the estimated TOT (TOTest=TOTcalc'−MP).

If the MP stays constant, then a near-perfect time transfer is achieved even when the destination node time scale is not stable, as long as the destination clock model parameters are stable.

Systems and methods are disclosed herein for optimal two-way time transfer (TWTT) over a network of transceivers, such as the purpose-built terrestrial PNT system. Each node in the network is equipped with a transmitter and a receiver. The transmitter periodically broadcasts a known waveform over a transmission medium. The receiver receives and measures the time of arrival (TOA) of the signals (i.e., can timestamp the signals) broadcast by the transmitters of some or all the other nodes in the network as well as the signal broadcast by the transmitter of its own node. There is no limitation on the type of transmission medium. In some embodiments, if a bidirectional communication channel exists between a given pair of network nodes A and B, that channel is approximately reciprocal, i.e., the propagation delay from Node A to Node B is approximately the same as the propagation delay from Node B to Node A. The network nodes and the communication channels between them can be modeled by a directed graph. This graph does not have to be complete. That is, not all pairs of nodes in the network are required to receive and timestamp each other's signals.

Each node of the network has a transmitter clock. The transmitter clocks of one or more nodes in the network are locked to synchronized time sources (e.g., GPS, LEO Satellites, synchronized Cesium clocks, etc.). These nodes are dubbed, the "leader" nodes hereinafter. The transmitter clocks of the other nodes in the network, dubbed the "follower" nodes hereinafter, derive their time from the leader nodes using the "optimal" network-based two-way time transfer (TWTT) method described herein.

An "observation window" is a time interval during which receivers in the network make a single TOA estimation for every node they receive from, including their own nodes. The time length of the observation window is predetermined and fixed (e.g., about 1 second). The observation window will then repeat periodically. The period of observation does not have to be equal to the length of the observation window, but it is preferably greater than or equal to that (e.g., 1-second-long observation windows repeated every 2 seconds). To get a good TOA estimation accuracy, it is desirable that the transmissions from different nodes during an observation window do not interfere with each other as seen by any of the node receivers. This can be achieved by using dedicated communication links for each pair of nodes that are physically separated from each other (e.g., direct communication over wire or fiber optics) or, in the case of a shared transmission medium (e.g., in a wireless network), it can be achieved by employing a multiple-access scheme such as TDMA or CDMA. In some embodiments, the TOA and other signal characteristics determine the validity and quality of the TOA.

During an observation window, the receiver on each node of the network (whether it is a leader or a follower node) estimates the TOA of the signal transmitted by the same node, hereinafter dubbed the "self" TOA, as well as those of the signals transmitted by all the other nodes in its coverage set, hereinafter dubbed the "remote" TOAs. The coverage set of a node is defined to be the set of all nodes in the network whose signal can be received by that node. Once the self-TOA and the remote-TOAs are estimated, the node subtracts the self-TOA from all the remote-TOAs. The resulting numbers are dubbed the time difference (TD) values hereinafter. At the end of each observation window, all nodes send their computed TD values to a centralized processing entity, for example at the TWTT server(s) 174 and/or receiver assistance server(s) 160. The TWTT server 174 uses all the TD values it receives from the nodes over a single observation window or over multiple observation windows to jointly estimate the time errors (a.k.a., time offsets) between the clocks of the follower nodes and the common clock of the leader nodes. Then, the TWTT server 174 sends each estimated time error to the corresponding follower node. The follower nodes use these time error values as inputs to their phase-locked loop (PLL) circuits to correct their clock offsets and synchronize their clocks with the leaders' clock. The time error estimation processes used in the TWTT server 174 are described here.

The clocks of all follower nodes in the network described above are synchronized to the common clocks of the leader nodes, thereby establishing a common time across all the nodes in the network. In some embodiments involving a single leader node and a single follower node, the standard approach for transferring time from the leader node to the follower node is to use the so-called two-way time transfer (TWTT) method. Over a single observation window, if each node can receive the other node's signal and generate a TD value, i.e., if two edges of opposite directions exist between the two nodes in the graph representing this simple network, then the TWTT server 174 can compute the time error between the two nodes by subtracting one of the TD values from the other one and dividing the result by two as shown below.

$$TD_{12} = t_2 - t_1 + t_{p,12} + \tilde{N}_{12}$$
$$TD_{21} = t_1 - t_2 + t_{p,21} + \tilde{N}_{21}$$
$$T_{12} = (TD_{12} - TD_{21})/2 = t_2 - t_1 + N_{12},$$
where Equation 1

$$N_{12} = \frac{t_{p,12} - t_{p,21}}{2} + \frac{\tilde{N}_{12} - \tilde{N}_{21}}{2}.$$

Equation 2

The $TD_{12}$ and $TD_{21}$ are the TD values computed by the two nodes, the $t_1$ and $t_2$ are the clock phases of the two nodes, and the $t_{p,12}$ and $t_{p,21}$ are the signal propagation time from Node 1 to Node 2 and from Node 2 to Node 1, respectively. The $\tilde{N}_{12}$, $\tilde{N}_{21}$, and $N_{12}$ are noise terms. The $T_{12}$, hereinafter dubbed the "TWTT value" corresponding to this pair of nodes provides an estimate of the time error $t_2-t_1$ between the two clocks. As a result of the channel reciprocity assumption (i.e., $t_{p,12}=t_{p,21}$) and in the absence of calibration errors, the noise terms are all zero mean and therefore the TWTT value above is an unbiased estimator of the time error. If Node 1 is the leader and Node 2 is the follower, this TWTT value is sent to Node 2 for clock correction. The sign of the TWTT value (i.e., computing $T_{12}$ versus $T_{21}$) is arbitrary as long as the TWTT server 174 and the PLL circuit in the follower node agree on that. Both TD values are needed for estimating the time error since there are two unknowns to solve for, i.e., the time error and the propagation time.

In some embodiments involving a network with multiple leader nodes and multiple follower nodes, a first approach for transferring time to a given follower node in the network can be summarized in the following steps.
1. Form the directed graph representing the network over a single observation window as described above (i.e., determine a directed edge from a first Node i to a second Node j if the $TD_{ij}$ exists in that observation window).
2. Convert the directed graph of Step 1 to an undirected graph through the following steps.
   a. For any pair of nodes connected with two edges of opposite directions (i.e., for any pair of nodes with bidirectional channels), replace the two directed edges with a single undirected edge; and
   b. For any pair of nodes connected with a single directed edge (i.e., for any pair of nodes with a unidirectional channel), remove that edge from the graph.
3. For a given follower node in the undirected graph created in Step 2, find a path from one of the leader nodes to the given follower node. One way of doing this is to define a fixed path for each follower node if side information about the quality of different communication links is available. Alternatively, search for the leader node that has the shortest path to the given follower node and find that shortest path. A shortest path is a path that has the least number of edges. The leader node and the shortest path found in this way may not be unique. If not unique, randomly pick one of the possibilities.
4. Transfer time from the leader node found in Step 3 to the given follower node over the path found in Step 3 by adding the TWTT values of all edges along that path with correct plus or minus signs. For example, if there is a shortest path $1\rightarrow2\rightarrow3\rightarrow4$ between Leader node 1 and Follower node 4 that goes through Follower nodes 2 and 3, time can be transferred from Node 1 to Node 4 by computing the following sum:

$$T_{12} + T_{23} + T_{34} = t_2 - t_1 + t_3 - t_2 + t_4 - t_3 + N_{12} + N_{23} + N_{34} =$$
$$t_4 - t_1 + N_{12} + N_{23} + N_{34}$$

Equation 3

The example solution described above has several potential disadvantages:
1. As shown in the above equation, the independent noise terms add up as the TWTT values are added up along the time transfer path. That means the variance of the time error estimate increases as the path length (i.e., the number of edges) between the leader and the follower nodes increases. As an example, if all noise terms in the network have the same variance $\sigma^2$, the estimation variances of the time errors of all follower nodes are always greater than or equal to $\sigma^2$.
2. The path selection process is not straightforward. Programming predefined paths for all follower nodes requires side information about the communication channels and is generally not easily automated and scaled up for larger networks. Choosing a shortest path does not necessarily minimize the estimation variance, but even if it does, it is not robust against outliers in the TWTT measurements along that path. In other words, a single outlier TWTT value over one of the edges along that path can result in a large estimation error.
3. The solution above does not benefit from gains that can be achieved by combining measurement data from multiple observation windows and multiple leader nodes.

In order to address the above shortcomings, an optimal network-based TWTT process has been developed, in accordance with some embodiments, where the time errors of all follower nodes (relative to the common time of the leader nodes) are jointly estimated using the TWTT measurements from all edges of the graph and over multiple observation windows (the network graph can change from one observation window to the next). The main advantages of this solution over the first approach above include:
1. Since the TWTT measurements from all edges of the graph are used for estimating the time errors of the follower nodes, the estimation variance for any given follower node is always less than or equal to that of the first approach above. As an example, for a network with a single leader node and V−1 (where V is the number of vertices in the graph) follower nodes observed over a single observation window, if all noise terms in the network have the same variance $\sigma^2$, and if the network graph is a complete graph, the estimation variances of the time errors of all follower nodes are given by $$\frac{2}{V}\sigma^2.$$

Whereas, in the first approach above, the variance is at least $\sigma^2$.
2. Apart from increased immunity to Gaussian noise described in Item 1 above, certain variants of the proposed solution also provide more robustness to measurement outliers.
3. There is no need for defining preprogrammed paths or implementing a complex automated path selection process. The proposed optimal solution effectively considers all possible paths from all leader nodes to all follower nodes and optimally combines them. As a result, the proposed solution is highly scalable.

4. The proposed solution benefits from gains that can be achieved by combining measurement data from multiple observation windows and multiple leader nodes.

A process for joint estimation of the clock offsets (i.e., time errors) of the follower nodes uses measurement data from a single observation window. In a general embodiment, there are multiple leader nodes and multiple follower nodes in the network. This scenario can be best represented using an undirected graph with V vertices (i.e., nodes) and E edges (i.e., links), where the graph nodes represent the network nodes, and an edge exists between a first Node i and a second Node j if and only if $TD_{ij}$ and $TD_{ji}$ are both available. Without loss of generality, the nodes are enumerated from 1 to V such that the first L nodes are the leader nodes (L≥1) and the next F=V−L nodes are the follower nodes. A TWTT value can be computed for every edge in this graph. The TWTT value corresponding to the edge between Node i and Node j (i.e., $T_{ij}$) is related to the time offset between the clocks of these two nodes (i.e., $t_j - t_i$) as shown below.

$$T_{ij} = t_j - t_i + N_{ij} \text{ and } i < j.$$  Equation 4

In order to uniquely define the sign of the TWTT value above, the first index (i.e., i) is assumed to always be smaller than the second index (i.e., j). This imposes an arbitrary but unique orientation on the graph which means it can be thought of as a directional graph. Any choice of orientation can be used, and they all give the same result as long as an agreed-upon plus/minus sign is used between the TWTT server 174 and the follower nodes. The above TWTT equations can be put into the matrix form:

$$T = Bt + N,$$  Equation 5 where T and N are E×1 vectors containing the TWTT values and the noise terms, respectively. The t is a V×1 vector containing the clock phases of all nodes, and B, which is an E×V matrix, is the so-called "incidence" matrix of the graph for the particular choice of orientation defined above. Each row of B has exactly one "1" and one "−1" entry and the other entries are all zero. The leader nodes have known clock phases and, therefore, without loss of generality it is assumed that their clock phases are equal to zero (i.e., $t_1 = t_2 = \ldots = t_L = 0$). Thus, the system of equations above is solved for the unknown phases of the follower nodes (i.e., for $t_{L+1}, \ldots, t_V$). This is equivalent to removing the first L columns of the incidence matrix B and the first L rows of the vector t. The new system of equations has E equations and F unknowns which in most cases is an overdetermined system of equations (there are usually more edges in the graph than follower nodes) and can be solved using various linear regression methods. However, there are cases where E≥F but the matrix B (after removing the columns corresponding to leader nodes) is rank deficient and, therefore, only a subset of the unknown follower phases can be solved for. This happens when the network graph is disconnected and there is no path between some of the follower nodes to any of the leader nodes.

The linear regression problem can be formulated by the following general form:

$$\hat{t} = \operatorname*{argmin}_{t} \left\| w^{1/p}(T - Bt) \right\|_p,$$  Equation 6 where $\|\cdot\|_p$ is the $L_p$ norm and W is a diagonal matrix containing some positive weight values on its diagonal. In the case of p=2, the above estimation problem reduces to a weighted least squares (WLS) regression problem which has a closed-form solution. When $W^{1/2}B$ is full rank, the WLS estimator and its covariance matrix are given by:

$$\hat{t}_{WLS} = (B^T W B)^{-1} B^T W T, \text{ and}$$  Equation 7

$$\operatorname{Cov}(\hat{t}_{WLS}) = (B^T W B)^{-1} B^T W R_N W B (B^T W B)^{-1}$$  Equation 8 where $R_N$ is the diagonal correlation matrix of the measurement noise vector.

If estimates of the noise variances are available, the weights can be set to be equal to the inverse of the noise variances (i.e., $W = R_N^{-1}$), in which case the WLS estimator is the maximum likelihood (ML) estimator of the follower phases assuming zero mean Gaussian noise terms. If the noise variances are not known, the weight values can be set to unity (i.e., W=I) resulting in the so-called ordinary least squares estimator (OLS).

In the case of p=1, the above estimation problem reduces to a weighted least absolute deviation (WLAD) regression problem which does not have a closed-form solution but can be solved numerically using iterative methods such as the iteratively reweighted least squares (IRLS) algorithm. If estimates of the mean absolute deviations (MAD) of the noise terms are available, the weights can be set to the inverse of the noise MADs in which case the WLAD estimator is the maximum likelihood (ML) estimator of the follower phases, assuming zero mean Laplace noise terms. If the noise MADs are not known, the weight values can be set to unity.

In general, the LAD method which is based on the $L_1$ norm optimization is more robust to outliers in the measurements than the LS method which is based on the $L_2$ norm optimization. A comparison between the estimation performance of the two methods is shown in the simulation results in the subsequent sections.

The process described above includes the steps of:
1. Generating the vector T of all TWTT values computed over a given observation window.
2. Generating the network graph corresponding to vector T (the graph may change from one observation window to the next).
3. Generating the incidence matrix B of the graph using the same orientation as the one used to calculate the TWTT values in Step 1.
4. Removing all columns of B corresponding to the leader nodes.
5. Removing all rows of B and all entries of T corresponding to the edges between leader nodes.
6. Identifying all components (i.e., connected subgraphs that are not part of any larger connected subgraph) of the graph that do not have any leader nodes in them. One way to do this is to find a basis for the null space of the incidence matrix B from Step 5. Then, if there is a natural number n for which the $n^{th}$ coordinate of all basis vectors is zero, that means Node n belongs to a component of the graph with no leader node.
7. Removing the columns of B corresponding to the nodes found in Step 6.
8. Removing all rows of B and all entries of T corresponding to the edges between the Nodes found in Step 6 (the remaining matrix will be full rank).
9. Generating a diagonal weight matrix W whose diagonal elements are equal to one over the estimated variances or one over the estimated MAD values of the TWTT values in T. If the variance or MAD values are not available, set W to the identity matrix.

10. Solving the weighted least squares (WLS) or the weighted least absolute deviation (WLAD) problem defined by the B, W, and T above to obtain the unknown clock phases of all follower nodes.

Examples below show several different scenarios for the case of a single observation window and equal TWTT measurement noise variances for all edges of the network graph. These examples present the performance gains that can be achieved by using the OLS variant of the proposed solution over a path-based solution used in the first approach discussed above. The OLS variant provides variance gains (i.e., reduces the estimation variance) but does not provide robustness to outliers. The LAD variant, however, provides both benefits but since the performance metrics of the LAD variant cannot be calculated in closed form, only the OLS performance metrics (i.e., the OLS covariance matrix) have been calculated and the performance gains of the LAD variant have been verified using simulation. The simulation results are shown in the subsequent sections.

Figure 10:
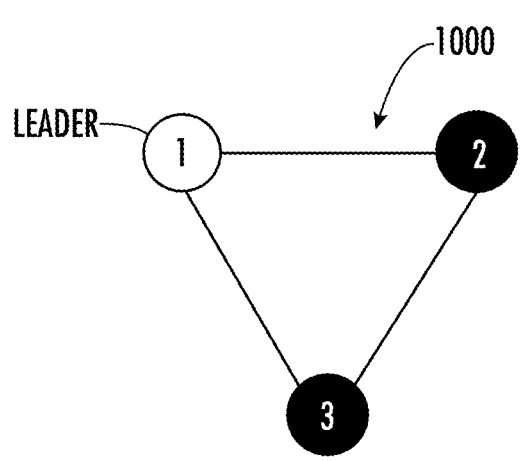
FIG. 10 is a first example network, in accordance with some embodiments.

A first example network 1000 is shown in FIG. 10, in accordance with some embodiments. The network 1000 is a complete graph with three vertices (V=3) one of which is a leader (L=1). Thus, the TWTT equations are:

$$T_{12} = t_2 - t_1 + N_{12},$$ Equation 9

$$T_{23} = t_3 - t_2 + N_{23}, \text{ and}$$ Equation 10

$$T_{13} = t_3 - t_1 + N_{13}.$$ Equation 11

In matrix form, the equations are:

$$T = Bt + N,$$ Equation 12 where:

$$B = \begin{bmatrix} -1 & 1 & 0 \\ 0 & -1 & 1 \\ -1 & 0 & 1 \end{bmatrix},$$ Equation 13

$$t = [t_1, t_2, t_3]^T, \text{ and}$$ Equation 14

$$N = [N_{12}, N_{23}, N_{13}]^T.$$ Equation 15

After removing the column(s) corresponding to the leader vertices, the equations become:

$$T = Bt + N,$$ Equation 16 where:

$$B = \begin{bmatrix} 1 & 0 \\ -1 & 1 \\ 0 & 1 \end{bmatrix},$$ Equation 17

$$t = [t_2, t_3]^T, \text{ and},$$ Equation 18

$$N = [N_{12}, N_{23}, N_{13}]^T.$$ Equation 19

Assuming equal variance $\sigma^2$ for all noise terms (i.e., equal weights), the LS solution and its covariance matrix are given by:

$$\hat{t} = \begin{pmatrix} \hat{t}_2 \\ \hat{t}_3 \end{pmatrix} = (B^T B)^{-1} B^T T = \frac{1}{3}\begin{pmatrix} 2T_{12} - T_{23} + T_{13} \\ T_{12} + T_{23} + 2T_{13} \end{pmatrix}, \text{ and}$$ Equation 20

$$Cov(\hat{t}) = (B^T B)^{-1} \sigma^2 = \frac{1}{3}\begin{pmatrix} 2 & 1 \\ 1 & 2 \end{pmatrix}\sigma^2.$$ Equation 21

A performance gain is achieved over the first approach described above. For example, if only the direct paths from the leader node to the two follower nodes (i.e., 1→2 and 1→3) are used to estimate $t_2$ and $t_3$, the estimation variances would be equal to $\sigma^2$ and if only the indirect paths (i.e., 1→3→2 and 1→2→3) are used, the estimation variances would be $2\sigma^2$. However, the optimal combination of the direct and indirect paths obtained by joint ML estimation achieves an estimation variance of $$\frac{2}{3}\sigma^2$$

for both unknowns.

Figure 11:
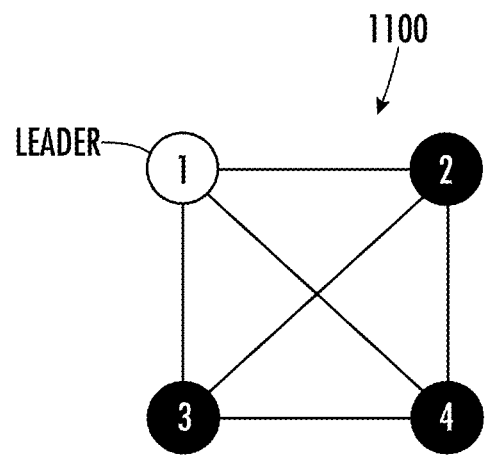
FIG. 11 is a second example network, in accordance with some embodiments.

A second example network 1100 is shown in FIG. 11, in accordance with some embodiments. The network 1100 is a complete graph with four vertices (V=4) one of which is a leader (L=1). Thus, the incidence matrix of the complete graph is:

$$B = \begin{bmatrix} -1 & 1 & 0 & 0 \\ -1 & 0 & 1 & 0 \\ -1 & 0 & 0 & 1 \\ 0 & -1 & 1 & 0 \\ 0 & -1 & 0 & 1 \\ 0 & 0 & -1 & 1 \end{bmatrix}.$$ Equation 22

The incidence matrix after removing the leader column is:

$$B = \begin{bmatrix} 1 & 0 & 0 \\ 0 & 1 & 0 \\ 0 & 0 & 1 \\ -1 & 1 & 0 \\ -1 & 0 & 1 \\ 0 & -1 & 1 \end{bmatrix}.$$ Equation 23

Assuming all weights are equal to $$\frac{1}{\sigma^2},$$

the LS solution and its covariance matrix are given by:

$$\hat{t} = \begin{pmatrix} \hat{t}_2 \\ \hat{t}_3 \\ \hat{t}_4 \end{pmatrix} = (B^T B)^{-1} B^T T = \frac{1}{4}\begin{pmatrix} 2T_{12} + T_{13} + T_{14} - T_{23} - T_{24} \\ T_{12} + 2T_{13} + T_{14} + T_{23} - T_{34} \\ T_{12} + T_{13} + 2T_{14} + T_{24} + T_{34} \end{pmatrix},$$ Equation 24 and $$Cov(\hat{t}) = (B^T B)^{-1} \sigma^2 = \frac{1}{4}\begin{pmatrix} 2 & 1 & 1 \\ 1 & 2 & 1 \\ 1 & 1 & 2 \end{pmatrix}\sigma^2.$$ Equation 25

Again, a performance gain is achieved over the first approach described above. For example, if only the direct single-edge path from the leader node to each follower node is used to estimate $t_2$, $t_3$, and $t_4$, the estimation variances would be equal to $\sigma^2$. However, the optimal solution achieves an estimation variance of $$\frac{1}{2}\sigma^2$$

for all unknowns.

Figure 12:
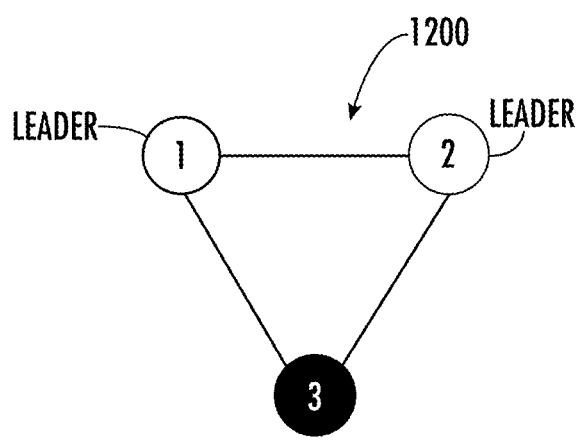
FIG. 12 is a third example network, in accordance with some embodiments.

A third example network 1200 is shown in FIG. 12, in accordance with some embodiments. The network 1200 is a complete graph with three vertices (V=3) two of which are leaders (L=2). Thus, the incidence matrix of the complete graph is:

$$B = \begin{bmatrix} -1 & 1 & 0 \\ 0 & -1 & 1 \\ -1 & 0 & 1 \end{bmatrix}. \quad \text{Equation 26}$$

The incidence matrix after removing the leader columns is:

$$B = \begin{bmatrix} 0 \\ 1 \\ 1 \end{bmatrix}. \quad \text{Equation 27}$$

The incidence matrix after removing the all-zero rows (corresponding to the edges between leader nodes) is:

$$B = \begin{bmatrix} 1 \\ 1 \end{bmatrix}. \quad \text{Equation 28}$$

Assuming all weights are equal to $$\frac{1}{\sigma^2},$$

the LS solution and its covariance matrix are given by:

$$\hat{t} = \hat{t}_3 = (B^T B)^{-1} B^T T = \frac{1}{2}(1\ 1)\begin{pmatrix} T_{13} \\ T_{23} \end{pmatrix} = \frac{1}{2}(T_{13} + T_{23}), \text{ and} \quad \text{Equation 29}$$

$$Cov(\hat{t}) = (B^T B)^{-1} \sigma^2 = \frac{1}{2}\sigma^2. \quad \text{Equation 30}$$

Yet again, a performance gain is achieved over the first approach described above. For example, if only the single-edge path between one of the leader nodes and the follower node is used to estimate $t_3$, the estimation variance would be equal to $\sigma^2$. However, the optimal solution achieves an estimation variance of $\frac{1}{2}\sigma^2$.

Figure 13:
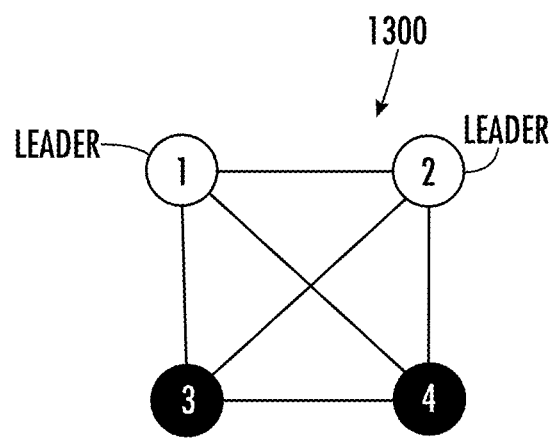
FIG. 13 is a fourth example network, in accordance with some embodiments.

A fourth example network 1300 is shown in FIG. 13, in accordance with some embodiments. The network 1300 is a complete graph with four vertices (V=4) two of which are leaders (L=2). Thus, the incidence matrix of the complete graph is:

$$B = \begin{bmatrix} -1 & 1 & 0 & 0 \\ -1 & 0 & 1 & 0 \\ -1 & 0 & 0 & 1 \\ 0 & -1 & 1 & 0 \\ 0 & -1 & 0 & 1 \\ 0 & 0 & -1 & 1 \end{bmatrix}. \quad \text{Equation 31}$$

The incidence matrix after removing the leader columns is:

$$B = \begin{bmatrix} 0 & 0 \\ 1 & 0 \\ 0 & 1 \\ 1 & 0 \\ 0 & 1 \\ -1 & 1 \end{bmatrix}. \quad \text{Equation 32}$$

The incidence matrix after removing the all-zero rows (corresponding to the edges between leader nodes) is:

$$B = \begin{bmatrix} 1 & 0 \\ 0 & 1 \\ 1 & 0 \\ 0 & 1 \\ -1 & 1 \end{bmatrix}. \quad \text{Equation 33}$$

Assuming all weights are equal to $$\frac{1}{\sigma^2},$$

the LS solution and its covariance matrix are given by:

$$\hat{t} = \begin{pmatrix} \hat{t}_3 \\ \hat{t}_4 \end{pmatrix} = (B^T B)^{-1} B^T T = \frac{1}{8}\begin{pmatrix} 3T_{13} + 2T_{23} - 2T_{34} + T_{14} + T_{24} \\ T_{13} + T_{23} + 2T_{34} + 3T_{14} + 3T_{24} \end{pmatrix}, \quad \text{Equation 34}$$

and $$Cov(\hat{t}) = (B^T B)^{-1} \sigma^2 = \frac{1}{8}\begin{pmatrix} 3 & 1 \\ 1 & 3 \end{pmatrix}\sigma^2. \quad \text{Equation 35}$$

Yet again, a performance gain is achieved over the first approach described above. For example, if only the direct single-edge paths from one of the leader nodes to each follower node are used to estimate $t_3$ and $t_4$, the estimation variances would be equal to $\sigma^2$. However, the optimal solution achieves an estimation variance of $$\frac{3}{8}\sigma^2$$

for all unknowns.

Figure 14:
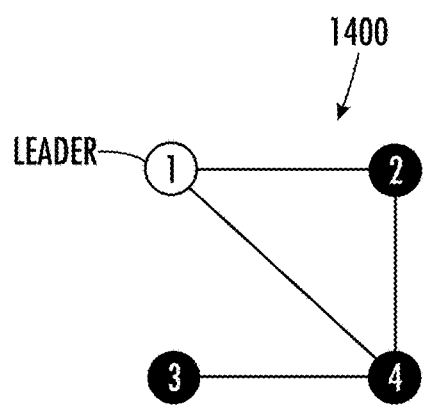
FIG. 14 is a fifth example network, in accordance with some embodiments.

A fifth example network 1400 is shown in FIG. 14, in accordance with some embodiments. The network 1400 is an incomplete graph with four vertices (V=4) one of which is a leader (L=1) connected as shown. Thus, the incidence matrix of the graph is:

$$B = \begin{bmatrix} -1 & 1 & 0 & 0 \\ -1 & 0 & 0 & 1 \\ 0 & -1 & 0 & 1 \\ 0 & 0 & -1 & 1 \end{bmatrix}. \quad \text{Equation 36}$$

The incidence matrix after removing the leader column is:

$$B = \begin{bmatrix} 1 & 0 & 0 \\ 0 & 0 & 1 \\ -1 & 0 & 1 \\ 0 & -1 & 1 \end{bmatrix}. \quad \text{Equation 37}$$

Assuming all weights are equal to $$\frac{1}{\sigma^2},$$

the LS solution and its covariance matrix are given by:

$$\hat{t} = \begin{pmatrix} \hat{t}_2 \\ \hat{t}_3 \\ \hat{t}_4 \end{pmatrix} = (B^T B)^{-1} B^T T = \frac{1}{3}\begin{pmatrix} 2T_{12} + T_{14} - T_{24} \\ T_{12} + 2T_{14} + T_{24} - 3T_{34} \\ T_{12} + 2T_{14} + T_{24} \end{pmatrix}, \text{ and} \quad \text{Equation 38}$$

$$Cov(\hat{t}) = (B^T B)^{-1}\sigma^2 = \frac{1}{3}\begin{pmatrix} 2 & 1 & 1 \\ 1 & 5 & 2 \\ 1 & 2 & 2 \end{pmatrix}\sigma^2. \quad \text{Equation 39}$$

Yet again, a performance gain is achieved over the first approach described above. For example, if only the shortest paths from the leader node to the follower nodes (i.e., 1→2, 1→4→3, and 1→4) are used to estimate $t_2$, $t_3$, and $t_4$, the estimation variances would be equal to $\sigma^2$, $2\sigma^2$, and $\sigma^2$, respectively. However, the optimal solution achieves estimation variances $$\frac{2}{3}\sigma^2, \frac{5}{3}\sigma^2, \text{ and } \frac{2}{3}\sigma^2,$$

respectively.

A sixth example network (not shown) is the general case of a complete graph with V nodes consisting of L leader nodes and F=V−L follower nodes. A Theorem 1 states that in a complete graph with V nodes, L leader nodes, and F=V−L follower nodes, if all TWTT measurements have the same noise variance $\sigma^2$, the equal weight ordinary least squares (OLS) estimator of the clock phases of the follower nodes, in the case of a single observation window, has the following covariance matrix:

$$Cov(\hat{t}_{OLS}) = \frac{\sigma^2}{V}\left(I_F + \frac{1}{L}U_F\right), \quad \text{Equation 40}$$

where:
$I_F$ is the identity matrix of size F,
$U_F$ is an F×F matrix whose elements are all equal to 1, and
$\sigma^2$ is the common variance of the TWTT measurement noises (for all edges of the graph).

In particular, the variances of the follower clock phase estimates (i.e., the diagonal elements of $Cov(\hat{t}_{OLS})$ above) are given by:

$$\sigma^2_{\hat{t}_{OLS}} = \frac{1}{V}\left(1 + \frac{1}{L}\right)\sigma^2. \quad \text{Equation 41}$$

For a proof of Theorem 1, let B denote the incidence matrix of the graph (before removing the leader columns). It is easy to show that for any graph:

$$B^T B = D - A, \quad \text{Equation 42}$$

where D is a V×V diagonal matrix whose diagonal elements are the degrees of the graph vertices and A is the adjacency matrix of the graph, i.e., a symmetric V×V matrix whose (i,j) element is 1 if Vertex i is connected to Vertex j and is 0 otherwise.

In the case of a complete graph, $D=(V-1)I_V$ and $A=U_V-I_V$, where $I_V$ and $U_V$ are the V×V identity and all-one matrices, respectively. Therefore:

$$B^T B = D - A = VI_V - U_V. \quad \text{Equation 43}$$

Without loss of generality, it is assumed that the first L columns of B correspond to the L leader vertices. Thus, B can be written as $B=[B_L | B_F]$, where $B_L$ and $B_F$ are submatrices corresponding to the leader and follower vertices, respectively ($B_L$ and $B_F$ do not correspond to incidence matrices of any graphs). Therefore:

$$B^T B = \begin{bmatrix} B_L^T \\ B_F^T \end{bmatrix}[B_L \ B_F] = \begin{bmatrix} B_L^T B_L & B_L^T B_F \\ B_F^T B_L & B_F^T B_F \end{bmatrix}. \quad \text{Equation 44}$$

That means the matrix $B_F^T B_F$ is the F×F matrix in the lower right corner of $B^T B$. Thus:

$$B_F^T B_F = VI_F - U_F = VI_F - u_F u_F^T, \quad \text{Equation 45}$$

where $u_F$ is an F×1 vector whose entries are all 1.

The covariance matrix of equal-weight ordinary least squares is given by:

$$Cov(\hat{t}_{OLS}) = \sigma^2(B_F^T B_F)^{-1} = \sigma^2(VI_F - u_F u_F^T)^{-1}. \quad \text{Equation 46}$$

Using the Woodbury matrix identity, the covariance matrix can be written as:

$$\text{Equation 47}$$

$$COV(\hat{t}_{OLS}) = \sigma^2(VI_F - u_F u_F^T)^{-1} =$$

$$\frac{\sigma^2}{V}\left(I_F + \frac{\frac{1}{V}u_F u_F^T}{1 - \frac{1}{V}u_F^T u_F}\right) = \frac{\sigma^2}{V}\left(I_F + \frac{1}{V-F}u_F u_F^T\right) = \frac{\sigma^2}{V}\left(I_F + \frac{1}{L}U_F\right),$$

and the proof is complete.

A performance gain is achieved over the conventional solution. For example, if only the direct single-edge path from the leader node to each follower node is used to estimate the unknown clock phases of the follower nodes, the estimation variances would be equal to $\sigma^2$ for all unknowns. However, the optimal solution achieves an estimation variance of $$\frac{1}{V}\left(1 + \frac{1}{L}\right)\sigma^2$$

for all unknowns. For example, given a fully connected (i.e., complete graph) network of V=7 nodes with L=1 leader nodes, the OLS estimator achieves the following estimation variance for each follower node:

$$\sigma^2_{\hat{t}} = \frac{1}{V}\left(1 + \frac{1}{L}\right)\sigma^2 = \frac{2}{7}\sigma^2. \quad \text{Equation 48}$$

That means the estimation variance of the OLS estimator is 29% of the estimation variance of the single hop (i.e., direct path from leader to each follower) estimator or, equivalently, the standard deviation of the OLS estimator is about 53% of the standard deviation of the single hop estimator.

Figure 15:
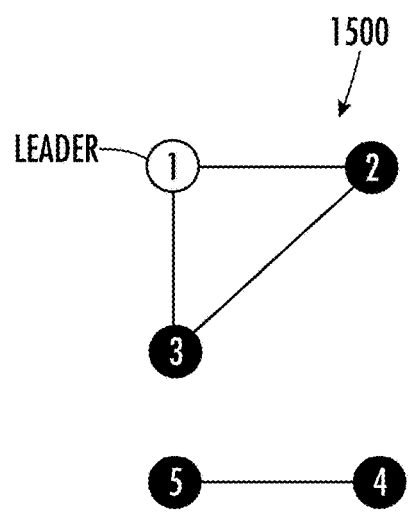
FIG. 15 is a seventh example network, in accordance with some embodiments.

A seventh example network 1500 is shown in FIG. 15, in accordance with some embodiments. The network 1500 is a disconnected graph with five vertices (V=5) one of which is a leader (L=1) connected as shown. Thus, the incidence matrix of the graph is:

$$B = \begin{bmatrix} -1 & 1 & 0 & 0 & 0 \\ -1 & 0 & 1 & 0 & 0 \\ 0 & -1 & 1 & 0 & 0 \\ 0 & 0 & 0 & -1 & 1 \end{bmatrix}. \quad \text{Equation 49}$$

The incidence matrix after removing the leader columns is:

$$B = \begin{bmatrix} 1 & 0 & 0 & 0 \\ 0 & 1 & 0 & 0 \\ -1 & 1 & 0 & 0 \\ 0 & 0 & -1 & 1 \end{bmatrix}. \quad \text{Equation 50}$$

The above incidence matrix (Equation 50) is rank deficient (rank(B)=3) which is a direct result of the graph being disconnected. Thus, it is impossible to estimate $t_4$ and $t_5$ because there is no path from the leader node to Nodes 4 and 5. However, after removing the disconnected vertices (i.e., columns) and the edges between them (i.e., rows) from the incidence matrix, it becomes full rank and the problem reduces to that of the first example network 1000 shown in FIG. 10, i.e.:

$$B = \begin{bmatrix} 1 & 0 \\ -1 & 1 \\ 0 & 1 \end{bmatrix}. \quad \text{Equation 51}$$

In general, all components of the graph that do not include any leader node must be removed in order to obtain a full rank matrix.

In some embodiments, a joint estimation of the clock offsets of the follower nodes using TWTT measurements is made using multiple observation windows. This is especially beneficial if the time-series of the clock phases at each follower node has a predictable trend for a time period spanning over multiple observation windows such that it can be represented by a parametric model where the number of model parameters is less than the number of observation windows over which the time-series is modeled. In that case, the TWTT measurements from multiple observation windows on multiple edges of the graph can all be used together to jointly estimate the model parameters of all follower clocks and from there estimate the most recent clock phase of each follower node (i.e., the clock phase at the end of the most recent observation window). If each follower node clock has a stable frequency over M consecutive observation windows (in between consecutive clock adjustments), the clock's phase time-series can be modeled by a line with two unknown parameters, a slope (i.e., resulted from the non-zero fractional frequency of the clock) and a y-intercept (i.e., the clock phase at the end of the most recent observation window). This linear phase model is given by:

$$t_k(n) = (1+\epsilon_k) T_s n + \mu_k, \quad \text{Equation 52}$$

$$k \in \{L+1, \ldots, V\}, \text{ and} \quad \text{Equation 53}$$

$$n \in \{-(M-1), \ldots, -1, 0\}. \quad \text{Equation 54}$$

where, the $t_k(n)$ is the clock phase time-series of the k'th follower node, the $\epsilon_k$ and $\mu_k$ are the fractional frequency offset and the phase offset of the k'th follower node (relative to the leader nodes), respectively, the $T_s$ is the time length of the observation window, and n is the observation window index.

Therefore, the TWTT equations over multiple edges of the graph and over multiple observation windows can be written as:

$$T_{ij}(n) = t_j(n) - t_i(n) + N_{ij}(n) = (\epsilon_j - \epsilon_i)T_s n + \mu_j - \mu_i + N_{ij}(n), \quad \text{Equation 55}$$

$$n \in \{-(M-1), \ldots, -1, 0\}, \quad \text{Equation 56}$$

and $$i < j \in \{1, \ldots, V\}, \quad \text{Equation 57}$$

where $T_{ij}(n)$ is the TWTT value corresponding to the edge between Node i and Node j at n'th observation window and $N_{ij}(n)$'s are the noise terms. The above system of equations can be written in matrix form and is given by $$T = C\theta + N, \quad \text{Equation 58}$$

where:

$$T \triangleq [T_{-(M-1)}^T, T_{-(M-2)}^T, \ldots, T_0^T]^T, \quad \text{Equation 59}$$

$$N \triangleq [N_{-(M-1)}^T, N_{-(M-2)}^T, \ldots, N_0^T]^T, \quad \text{Equation 60}$$

$$T_n \triangleq [T_{ij}(n) | \{i,j\} \in S_E(n)]^T, \quad \text{Equation 61}$$

where:

$$n \in \{-(M-1), \ldots, -1, 0\},$$

$$N_n \triangleq [N_{ij}(n) | \{i,j\} \in S_E(n)]^T, \quad \text{Equation 62}$$

where:

$$n \in \{-(M-1), \ldots, -1, 0\}, \theta = \begin{pmatrix} \epsilon \\ \mu \end{pmatrix}, \quad \text{Equation 63}$$

$$\epsilon = [\epsilon_{L+1}, \ldots, \epsilon_V]^T, \quad \text{Equation 64}$$

$$\mu = [\mu_{L+1}, \ldots, \mu_V]^T, \text{ and} \quad \text{Equation 65}$$

$$C = \begin{bmatrix} -(M-1)T_s B_{-(M-1)} & B_{-(M-1)} \\ \vdots & \vdots \\ -T_s B_{-1} & B_{-1} \\ 0 & B_0 \end{bmatrix}. \quad \text{Equation 66}$$

The $S_E(n)$, $n=-(M-1), \ldots, -1, 0$, is the set of all edges of the network graph at observation window n, and $B_n$, $n=-(M-1), \ldots, -1, 0$, is the incidence matrix of the network graph at observation window n after removing the columns corresponding to the leader nodes and the rows corresponding to the edges between the leader nodes.

The above system of equations can be solved for $\theta = (\epsilon^T, \mu^T)^T$ using the WLS or WLAD linear regression methods to obtain $\hat{\theta} = (\hat{\epsilon}^T, \hat{\mu}^T)^T$. Only the vector $\hat{\mu}$ of the estimated phase y-intercepts is needed for correcting the follower clocks, and the vector $\hat{\epsilon}$ of the estimated fractional frequencies is discarded.

General steps for performing the above process include:
1. Generating the vector T of all TWTT values for the entire network and over M observation windows.
2. Generating a network graph for each of the M observation windows (the graph may change from one observation window to the next).

3. Generating the incidence matrix $B_n$ of the graph corresponding to observation window n for all $n \in \{-(M-1), \ldots, -1, 0\}$ using the same orientation as the one used to calculate the TWTT values in Step 1.
4. Removing all columns of $B_n$ corresponding to the leader nodes for all $n \in \{-(M-1), \ldots, -1, 0\}$.
5. Removing all rows of $B_n$ and all entries of T corresponding to the edges between leader nodes for all $n \in \{-(M-1), \ldots, -1, 0\}$.
6. Forming the matrix C above.
7. Finding a basis for the null space of Matrix C. Then, finding all natural numbers n for which the $n^{th}$ coordinate of all basis vectors is zero.
8. Removing the $n^{th}$ column of C for all numbers n found in Step 7.
9. Removing all all-zero rows of C and the corresponding entries of T (the remaining matrix C will be full rank).
10. Generating a diagonal weight matrix W whose diagonal elements are equal to one over the estimated variances or one over the estimated MAD values of the TWTT values in T. If the variance or MAD values are not available, set W to the identity matrix.
11. Solving the weighted least squares (WLS) or the weighted least absolute deviation (WLAD) problem defined by the C, W, and T above to obtain the unknown phases and fractional frequencies of the clocks of all follower nodes.

A simpler but less optimal way of solving the above system of equations is to first estimate the y-intercept and slope of the phase difference time series for each pair of nodes in the network and then use the estimated y-intercept values and the inverse of the estimated estimation variances as TWTT and weight inputs, respectively, to the single observation window estimation problem described in the previous section.

In some embodiments, an eighth example (not shown) describes a special case of the multiple observation windows scenario where the network graph remains the same for all observation windows, and all edges of the graph have the same TWTT measurement noise variance. The eighth example shows the performance gain achieved by the OLS variant of the proposed solution over the solution provided by the first approach described above that only uses a single observation window and a single path for transferring time to each follower node. The OLS variant provides variance gains (i.e., reduces the estimation variance) but does not provide robustness to outliers. The LAD variant, however, provides both benefits but since the performance metrics of the LAD variant cannot be calculated in closed form, only the OLS performance metrics (i.e., the OLS covariance matrix) are calculated and the performance gains of the LAD variant are verified using simulation. The simulation results using a special case of the eighth example network are described in the subsequent section. The simulation results also include a scenario where the network graph does not remain the same over all observation windows.

A graph of the eighth example network, which remains unchanged over M consecutive observation windows, has a total number of V nodes consisting of L leader nodes and F=V−L follower nodes, and its incidence matrix is denoted by B.

Theorem 2 states that if the network graph of the eighth example network remains the same over M observation windows and if all TWTT measurements have the same noise variance $\sigma^2$, the equal weight ordinary least squares (OLS) estimator of the y-intercepts of the clock phase time series of the follower nodes has the following covariance matrix:

$$COV(\hat{\mu}_{OLS}) = \frac{2(2M-1)\sigma^2}{M(M+1)}(B^T B)^{-1}, \qquad \text{Equation 67}$$

where:
B is the incidence matrix of the network graph, and
$\sigma^2$ is the common variance of the TWTT measurement noises (for all edges of the graph).

A performance gain is achieved over the first approach described above. For example, the expression for the covariance matrix above shows that, when M observation windows are used instead of a single observation window (which is the case in the first approach), the estimation variances are reduced by a factor of $$\frac{2(2M-1)}{M(M+1)}.$$

Therefore, the asymptotic improvement in the estimation variances as M grows larger is equal to $$\frac{4}{M}.$$

This improvement is on top of the improvement obtained by joint estimation of all unknowns over the entire graph for a single observation window. For example, in the case of a complete graph observed over M observation windows, the overall reduction in the estimation variances compared to the first approach is given by:

$$\frac{2(2M-1)}{M(M+1)}\frac{1}{V}\left(1+\frac{1}{L}\right), \qquad \text{Equation 68}$$

which in the case of L=1 and for large M is approximately equal to $$\frac{8}{MV}.$$

That means, for a complete graph with a total of V=8 nodes and L=1 leader node observed over M=10 observation windows, the OLS variant of the optimum solution can reduce the estimation variances of all follower nodes by a factor of 10 compared to the first approach where single-edge direct path time transfer over a single observation window is used.

Figure 16:
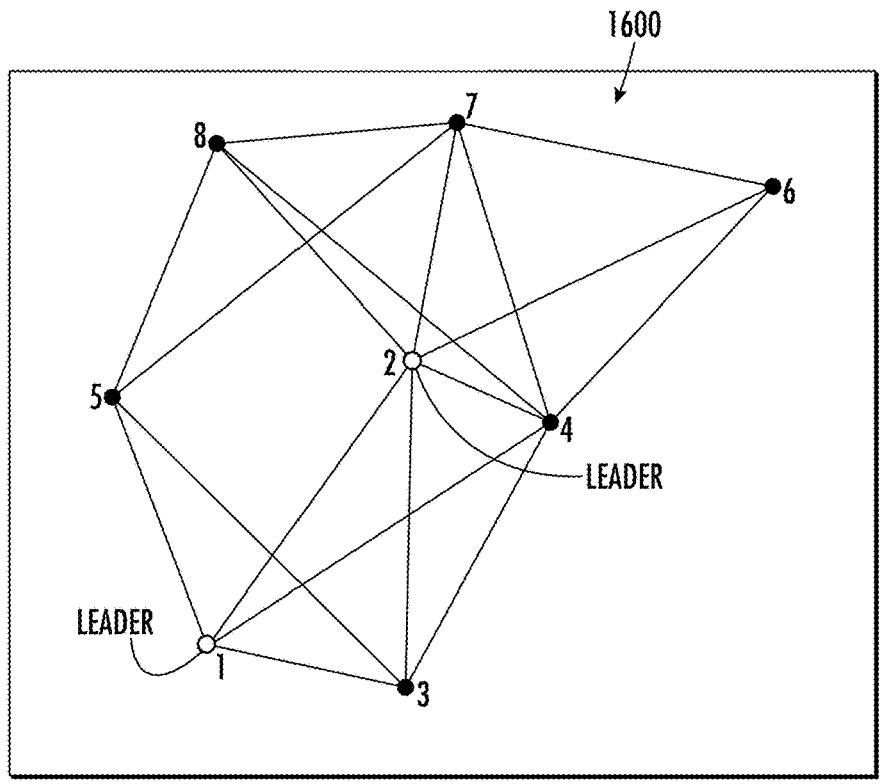
FIG. 16 shows an example of simulation results of an example network, in accordance with some embodiments.

As an example of simulation results, the example network 1600, shown in FIG. 16, having V=8 nodes with L=2 leader nodes and F=6 follower nodes, is considered over M=10 observation windows, in accordance with some embodiments. The network graph at any observation window is randomly generated by selecting a subset of edges from the base graph shown in FIG. 16. The probability of selecting any given edge in this random selection scheme is denoted by $p_e$. The set of nodes remains the same at all observation windows. A random set of fractional frequencies $\epsilon_i$'s and phase offsets $\mu_i$'s for the follower nodes is generated at the beginning of the simulation. The values of these random frequencies and phase offsets are kept fixed during the simulation iterations. The TWTT measurement noises are modeled as i.i.d. (independent and identically distributed) Gaussian random variables with zero mean and standard deviation $\sigma=1$ ns. Moreover, at any observation window and for any edge that is selected from the base graph during that observation window, a large random outlier noise is randomly added to the TWTT value of that edge with probability $p_o$.

Figure 17:
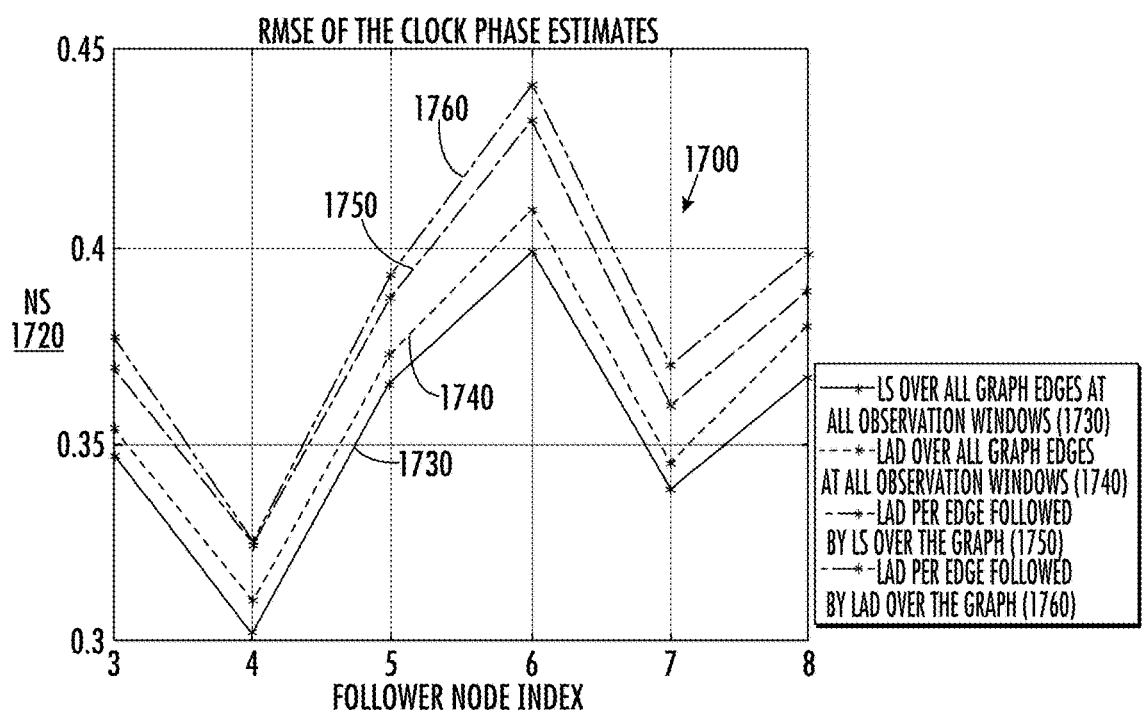
FIG. 17 shows a graph of the simulation results for the example in FIG. 16, in accordance with some embodiments.

FIG. 17 shows a graph 1700 of the root mean square error (RMSE) of the clock offset estimations of the follower nodes for four different variants of the proposed process over 1000 iterations of the simulation when $p_e=0.9$ and $p_o=0$. The x-axis is the follower node index 1710 and the y-axis is the RMSE of the clock offset estimate 1720 in nanoseconds (ns). The process variants are:

A graph 1730 illustrating LS over all graph edges at all observation windows: apply LS regression over the TWTT measurements on all edges of the graphs in all observation windows to jointly estimate the $\epsilon$ and $\mu$ vectors of the follower nodes.

A graph 1740 illustrating LAD over all graph edges at all observation windows: apply LAD regression over the TWTT measurements on all edges of the graphs in all observation windows to jointly estimate the $\epsilon$ and $\mu$ vectors of the follower nodes.

A graph 1750 illustrating LAD per edge followed by LS over the graph: for every edge in the graph obtained by taking the union of the graphs of all observation windows, apply a LAD regression (if possible) on the TWTT values of that edge (over all observation windows) to estimate the slope and the y-intercept of the TWTT values on that edge. Then, form a new graph by including all edges that have resulted in a LAD solution and assign the estimated y-intercept values to the edges of this new graph (and discard the estimated slope values). Apply an LS regression on the y-intercept values in the new graph to obtain an estimate of the $\mu$ vector.

A graph 1760 illustrating LAD per edge followed by LAD over the graph: for every edge in the graph obtained by taking the union of the graphs of all observation windows, apply a LAD regression (if possible) on the TWTT values of that edge (over all observation windows) to estimate the slope and the y-intercept of the TWTT values on that edge. Then, form a new graph by including all edges that have resulted in a LAD solution and assign the estimated y-intercept values to the edges of this new graph (and discard the estimated slope values). Apply a LAD regression on the y-intercept values in the new graph to obtain an estimate of the $\mu$ vector.

As shown in FIG. 17, all process variants result in roughly the same estimation RMSE values. However, the RMSE values of different follower nodes are not the same. Moreover, the RMSE values are all less than 0.5 ns, whereas the RMSE of the clock offset estimates obtained from the first approach, described in the previous sections, based on a single path and over a single observation window is always greater than $\sigma=1$ ns.

Figure 18:
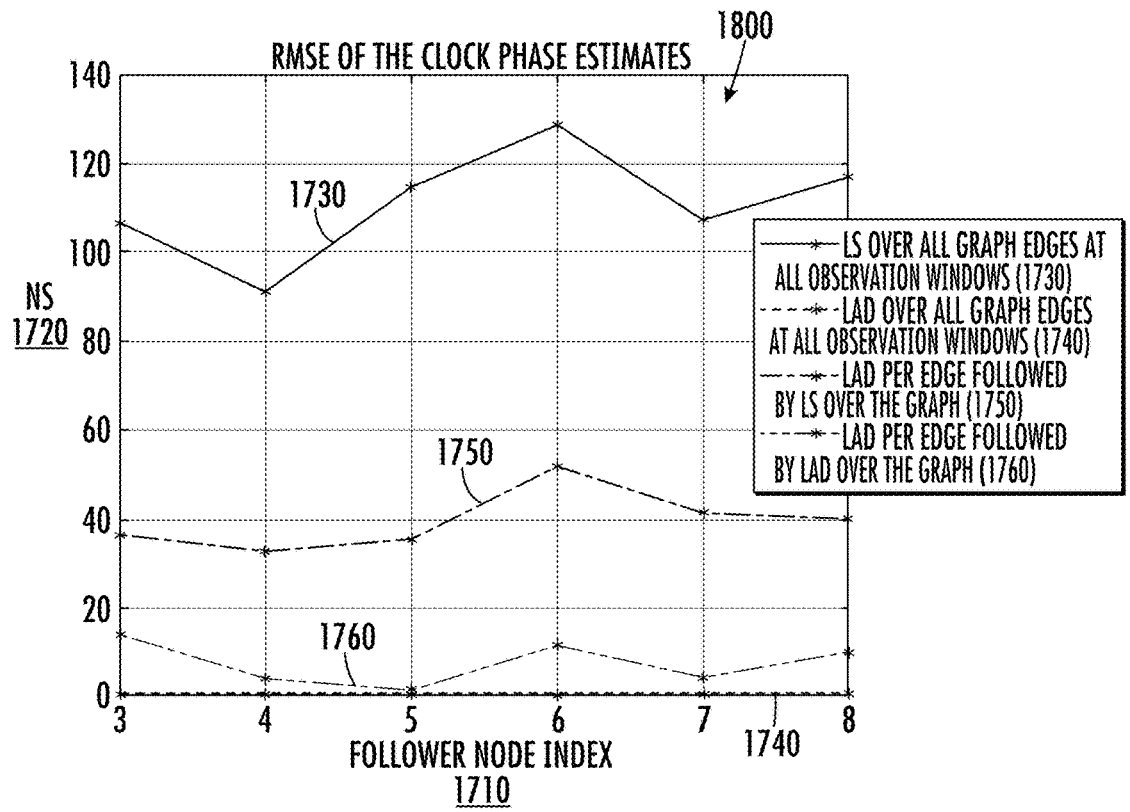
FIG. 18 is a graph showing the root mean square error (RMSE) of the clock offset estimations of follower nodes for different variants of the proposed process over many iterations of a second example of the simulation, in accordance with some embodiments.
Figure 19:
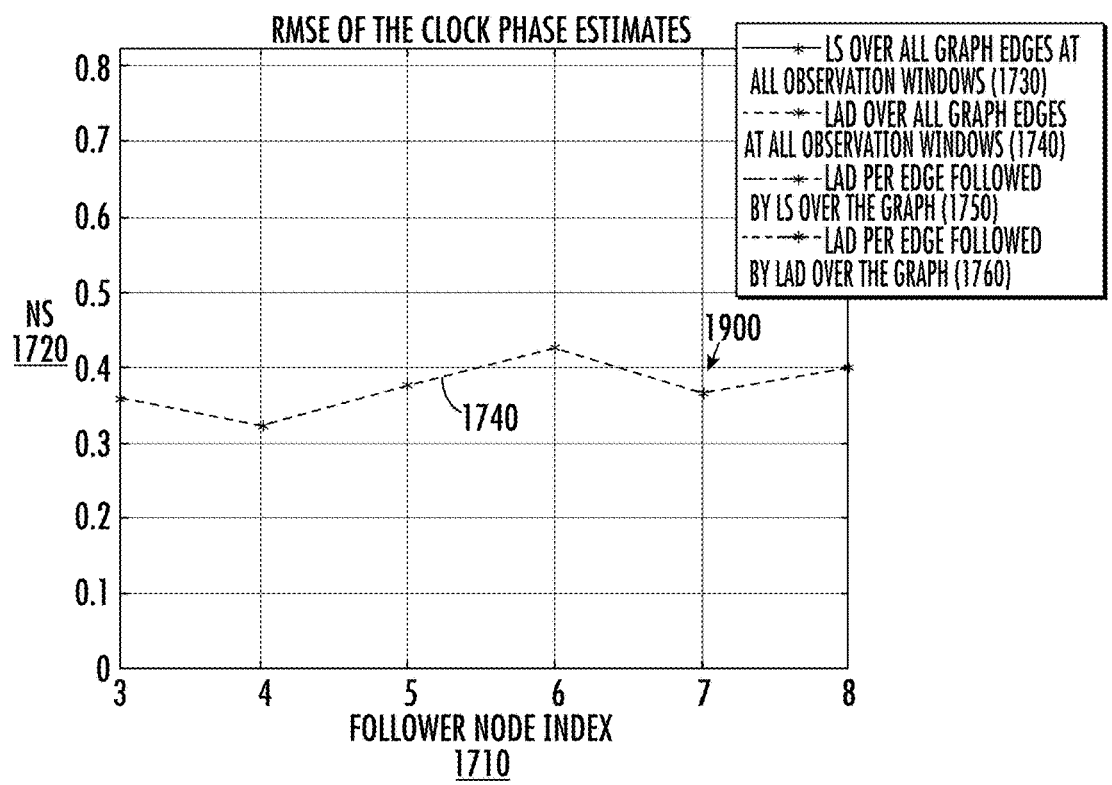
FIG. 19 shows a close-up view of the graph of the RMSE of FIG. 18 of the LAD over all graph edges at all observation windows, in accordance with some embodiments.

FIG. 18 shows the graph 1800 of the root mean square error (RMSE) of the clock offset estimations of the follower nodes for four different variants of the proposed process over 1000 iterations of the simulation when $p_e=0.9$ and $p_o=0.1$. The x-axis is the follower node index 1710 and the y-axis is the RMSE of the clock offset estimate 1720 in nanoseconds (ns). As illustrated in FIG. 18, the LAD based variants result in much better performance in the presence of outliers as compared to the LS based variants. The best result is obtained by the "LAD over all graph edges at all observation windows" variant 1740. FIG. 19 shows a close-up view 1900 of the graph of the RMSE of FIG. 18 of the LAD over all graph edges at all observation windows 1740. As shown on the graph 1900 in FIG. 19, this variant of the process achieves RMSE values that are in the same range as those obtained in the case of no outlier measurements shown in FIG. 17.

Certain aspects disclosed herein relate to estimating the positions of mobile devices—e.g., where the position is represented in terms of: latitude, longitude, and/or altitude coordinates; x, y, and/or z coordinates; angular coordinates; or other representations. Various techniques to estimate the position of a mobile device can be used, including trilateration, which is the process of using geometry to estimate the position of a mobile device using distances traveled by different "positioning" (or "ranging") signals that are received by the mobile device from different beacons (e.g., terrestrial transmitters and/or satellites). If position information like the transmission time and reception time of a positioning signal from a beacon is known, then the difference between those times multiplied by speed of light would provide an estimate of the distance traveled by that positioning signal from that beacon to the mobile device. Different estimated distances corresponding to different positioning signals from different beacons can be used along with position information like the locations of those beacons to estimate the position of the mobile device. Positioning systems and methods that estimate a position of a mobile device (in terms of latitude, longitude and/or altitude) based on positioning signals from beacons (e.g., transmitters, and/or satellites) and/or atmospheric measurements are described in co-assigned U.S. Pat. No. 8,130,141, issued Mar. 6, 2012, and U.S. Pat. No. 9,057,606, issued Jun. 16, 2015. It is noted that the term "positioning system" may refer to satellite systems (e.g., Global Navigation Satellite Systems (GNSS) like GPS, GLONASS, Galileo, and Compass/Beidou), terrestrial transmitter systems, and hybrid satellite/terrestrial systems.

Figure 20:
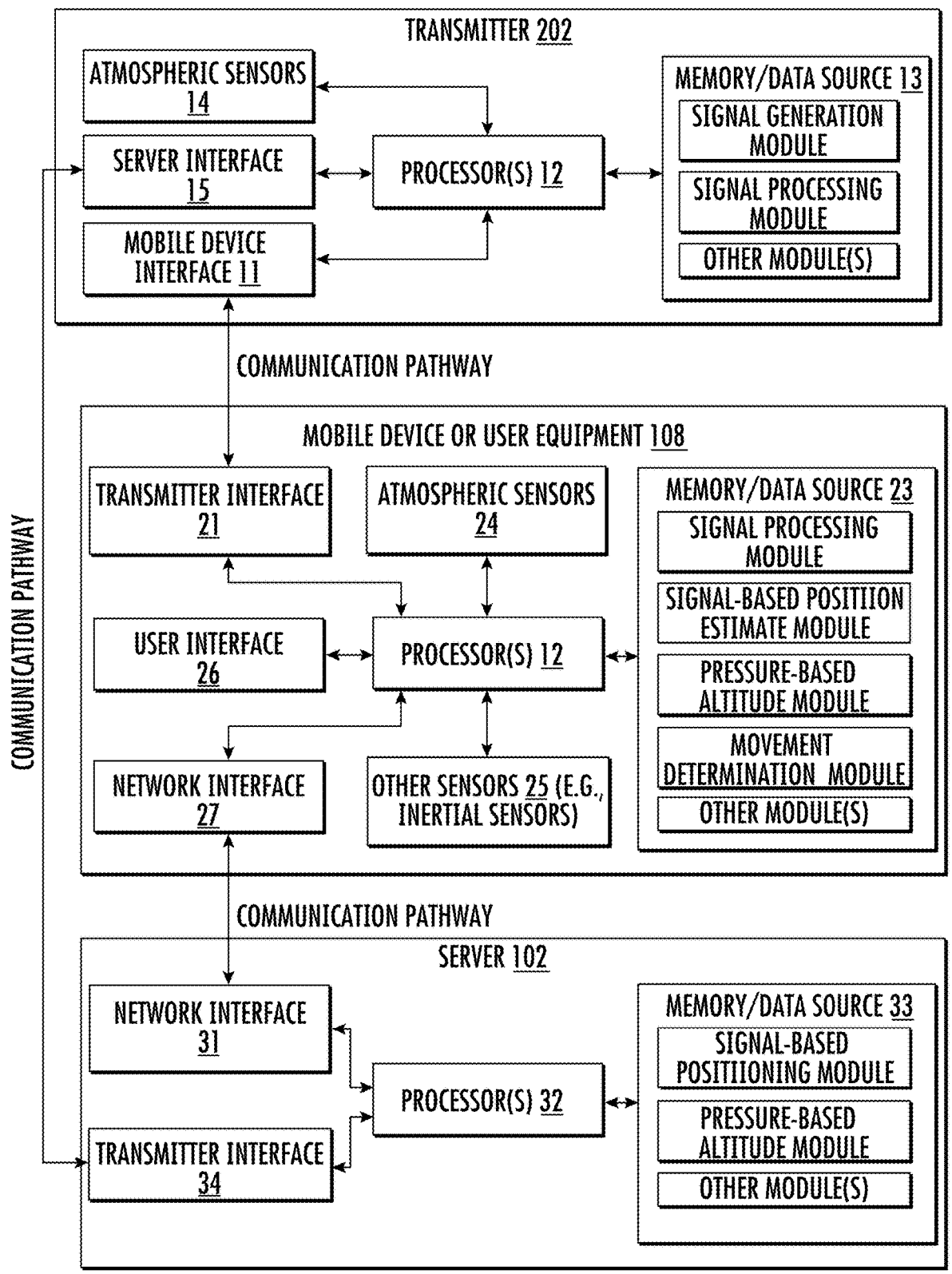
FIG. 20 depicts simplified schematic diagrams of a transmitter, a mobile device, and a server, in accordance with some embodiments, in accordance with some embodiments.

FIG. 20 depicts simplified schematic diagrams of a transmitter, a mobile device, and a server, in accordance with some embodiments. By way of example in FIG. 20, transmitters 202 (e.g., any transmitter such terrestrial PNT beacons 106, BTS 104, among others) discussed herein may include: a mobile device interface 11 for exchanging information with a mobile device 108 (or UE timing receiver 188) (e.g., antenna(s) and RF front end components known in the art or otherwise disclosed herein); one or more processor(s) 12; memory/data source 13 coupled to one or more processors 12 for providing storage and retrieval of information and/or program instructions; atmospheric sensor(s) 14 for measuring environmental conditions (e.g., pressure, temperature, humidity, other) at or near the transmitter 202; a server interface 15 for exchanging information with a server 102 (e.g., receiver assistance server(s) 160 or TWTT server 174) (e.g., an antenna, a network interface, or other); and any other components known to one of ordinary skill in the art. The memory/data source 13 may include memory storing software modules with executable instructions, and the processor(s) 12 may perform different actions by executing the instructions from the modules, including: (i) performance of part or all of the methods as described herein or otherwise understood by one of skill in the art as being performable at the transmitter 202; (ii) generation of positioning signals for transmission using a selected time, frequency, code, and/or phase; (iii) processing of signaling received from the mobile device 108 or another source; or (iv) other processing as required by operations described in this disclosure. Signals generated and transmitted by the transmitter 202 may carry different information that, once determined by the mobile device 108 or the server 102, may identify the following: the transmitter 202; the transmitter's position; environmental conditions at or near the transmitter 202; and/or other information known in the art. The atmospheric sensor(s) 14 may be integral with the transmitter 202 or separate from the transmitter 202 and either co-located with the transmitter 202 or located in the vicinity of the transmitter 202 (e.g., within a threshold amount of distance).

By way of example in FIG. 20, the mobile device 108 may include a network interface 27 for exchanging information with the server 102 via the network 159 (e.g., a wired and/or a wireless interface port, an antenna, and RF front end components known in the art or otherwise disclosed herein); one or more processor(s) 22; memory/data source 23 for providing storage and retrieval of information and/or program instructions; atmospheric sensor(s) 24 (including the barometric pressure sensor 186) for measuring environmental conditions (e.g., pressure, temperature, other) at the mobile device 108; other sensor(s) 25 for measuring other conditions (e.g., compass, accelerometer and inertial sensors for measuring movement and orientation); a user interface 26 (e.g., display, keyboard, microphone, speaker, other) for permitting the user of the mobile device 108 to provide inputs and receive outputs; and any other components known to one of ordinary skill in the art. A GNSS interface and processing unit (not shown) are contemplated, which may be integrated with other components or a standalone antenna, RF front end, and processors dedicated to receiving and processing GNSS signaling. The memory/data source 23 may include memory storing data and software modules with executable instructions, including a signal processing module, a signal-based position estimate module, a pressure-based altitude module, a movement determination module, the data packet, and modules.

The processor(s) 22 may perform different actions by executing the instructions from the modules, including: (i) performance of part or all of the methods, processes and techniques as described herein or otherwise understood by one of ordinary skill in the art as being performable at the server 102; (ii) estimation of an altitude of the mobile device 108; (iii) computation of an estimated position of the mobile device 108; (iv) performance of calibration techniques; (v) calibration of the mobile device 108; (vi) determination of calibration conduciveness for a calibration opportunity; or (vii) other processing as required by operations or processes described in this disclosure. Steps performed by servers 102 as described herein may also be performed on other machines that are remote from the mobile device 108, including computers of enterprises or any other suitable machine.

By way of example in FIG. 20, the server 102 may include: a network interface 31 for exchanging information with the mobile device 108 and other sources of data via the network 159 (e.g., a wired and/or a wireless interface port, an antenna, or other); one or more processor(s) 32; memory/data source 33 for providing storage and retrieval of information and/or program instructions; and any other components known to one of ordinary skill in the art. The memory/data source 33 may include memory storing software modules with executable instructions, a signal-based positioning module, a pressure-based altitude module, as well as other modules for each of the above-described methods and processes or portions/steps thereof.

The processor(s) 32 may perform different actions by executing instructions from the modules, including: (i) performance of part or all of the methods, processes, and techniques as described herein or otherwise understood by one of ordinary skill in the art as being performable at the server 102; (ii) estimation of an altitude of the mobile device 108; (iii) computation of an estimated position of the mobile device 108; or (iv) other processing as required by operations or processes described in this disclosure. Steps performed by servers 102 as described herein may also be performed on other machines that are remote from the mobile device 108, including computers of enterprises or any other suitable machine.

Reference has been made to embodiments of the disclosed invention. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only and is not intended to limit the invention.

What is claimed is:

1. A method, comprising:
   receiving, by a mobile device, a plurality of first signals from one or more first transmitters in a network, each first signal having first data including an associated time that is non-synchronized to the time of another first signal of the plurality of first signals;
   synchronizing, by one or more processors, the associated time of each first signal to a common time scale, wherein synchronizing the associated time of each first signal to a common time scale includes:
      receiving, by a receiver of a listening device at a destination node from a first transmitter of the one or more first transmitters at a source node, a signal waveform having a time signature, the time signature being pre-defined points on the signal waveform that are transmitted at specific times relative to a local time scale, wherein the receiver measures a time of arrival (TOA) of the pre-defined points on the signal waveform;
      determining a transmission time of the signal waveform based on a known distance between the source node and the destination node and the measured TOA; and
      translating a time of transmission of the signal waveform to a time scale of the destination node based on the determined transmission time; and
   determining, by one or more processors, a position of the mobile device using the common time scale of the plurality of first signals.

2. The method of claim 1, further comprising:
determining, by the one or more processors, parameters of the first signal including a first transmitter identification, first transmitter position, and first transmitter characteristics;
wherein the determining the position of the mobile device uses at least a portion of the parameters.

3. The method of claim 1, wherein non-synchronized being the associated time of each first signal is based on a local time scale that is different from the common time scale.

4. The method of claim 1, wherein the common time scale is Coordinated Universal Time (UTC).

5. The method of claim 1, wherein the plurality of first signals is generated from a system including a cellular (3G/4G/5G) deployment, WiFi transmitter, Bluetooth transmitter, digital TV, one that broadcasts digital signals with timing information, or a combination thereof.

6. The method of claim 1, wherein the plurality of first signals is a terrestrial or satellite-based wireless signal of a non-location-based system that can be used to determine range, pseudorange, or time of arrival (TOA).

7. The method of claim 1, wherein the one or more processors determining the position of the mobile device is in the mobile device.

8. The method of claim 1, wherein the one or more processors determining the position of the mobile device is at a server.

9. The method of claim 1, further comprising:
receiving, by a listening device, a plurality of second signals from one or more second transmitters in the network, each second signal having second data including an associated time that is based on the common time scale; and
receiving the plurality of first signals at a plurality of listening devices, the plurality of listening devices being configured to listen to the plurality of first signals;
wherein the synchronizing comprises:
synchronizing, by one or more processors, the associated time of each first signal to the common time scale using the second signals.

10. The method of claim 9, wherein:
the listening device is a first listening device;
wherein the synchronizing comprises:
receiving, by the first listening device from a transmitter having a known location, a signal waveform having a time signature, the time signature being pre-defined points on the signal waveform that are transmitted at specific times relative to a local time scale, wherein the listening device measures a time of arrival (TOA) of the pre-defined points on the signal waveform;
receiving by a second listening device, the signal waveform;
exchanging between the first listening device and the second listening device, time of arrival (TOA) measurements of the signal waveform on the respective local time scales; and
determining, time corrections for the respective local time scale of the first listening device and the second listening device relative to an arbitrary common time scale, wherein the determining uses the TOA at first and second listening devices, a time corresponding to a distance between the transmitter and the first listening device, and a time corresponding to a distance between the transmitter and the second listening device.

11. The method of claim 1, further comprising:
receiving, by a listening device, an indication of the common time scale from another listening device; and
receiving the plurality of first signals at the listening device;
wherein the synchronizing comprises:
synchronizing, by one or more processors, the associated time of each first signal to the common time scale using the received indication of the common time scale.

12. The method of claim 1, wherein the synchronizing comprises:
receiving the plurality of first signals at a plurality of listening devices, the plurality of listening devices being configured to listen to the plurality of first signals and have access to the common time scale;
transmitting, by the plurality of listening devices to one or more processors, an indication of the first data including the associated times of the received plurality of first signals; and
generating, by the one or more processors from the one or more processors, timing correction data to synchronize the associated time of each first signal to the common time scale.

13. The method of claim 1, further comprising:
receiving, by the mobile device, a plurality of second signals from one or more second transmitters in the network, each second signal having second data including an associated time that is based on the common time scale;
wherein:
the one or more second transmitters are nodes in the network;
each transmitter of the one or more second transmitters includes a respective receiver; and
a first transmitter of the second transmitters is designated as a first node, and a second transmitter of the second transmitters is designated as a second node;
the synchronizing comprises:
determining, by a first receiver of the first node and a second receiver of the second node, a respective self-TOA, the self-TOA being a time of arrival (TOA) of a signal waveform transmitted by a same node;
determining, by the first receiver and the second receiver, a respective remote-TOA, the remote-TOA being a time of arrival (TOA) of the signal waveform transmitted by other nodes that is not itself;
determining, by the first receiver and the second receiver, a respective plurality of time differences by subtracting the respective self-TOA from all the remote-TOAs;
receiving, by the one or more processors, the plurality of time differences corresponding to the first receiver and the second receiver;
determining, by the one or more processors, respective time correction factors between the first receiver and the second receiver based on the plurality of time differences; and
receiving, by the first receiver and the second receiver, the respective time correction factors, wherein the first receiver and the second receiver use the received time correction factors to synchronize a respective clock at the receiver to the common time scale.

14. The method of claim 1, further comprising:
receiving, by the mobile device, a plurality of second signals from one or more second transmitters in the network, each second signal having second data including an associated time that is based on the common time scale;

wherein the synchronizing comprises:
  synchronizing, by one or more processors, the associated time of each second signal and the associated time of each first signal to the common time scale; and
wherein the determining comprises:
  determining, by one or more processors, the position of the mobile device using the common time scale of the plurality of first signals and the common time scale of the plurality of second signals.

15. The method of claim 14, wherein the synchronizing comprises:
  receiving, by a receiver of a listening device at a destination node from a first transmitter of the one or more first transmitters at a source node, a signal waveform having a time signature, the time signature being pre-defined points on the signal waveform that are transmitted at specific times relative to a local time scale, wherein the receiver measures the time of arrival (TOA) of the pre-defined points on the signal waveform;
  determining a transmission time of the signal waveform based on a known distance between the source node and the destination node and the measured TOA; and
  translating the time of transmission of the signal waveform to a time scale of the destination node based on the determined transmission time.

16. The method of claim 14, wherein the common time scale is Coordinated Universal Time (UTC).

17. The method of claim 14, wherein the one or more second transmitters are a purpose-built terrestrial beacon of a terrestrial Positioning, Navigation, and Timing (PNT) system.

18. The method of claim 14, wherein the synchronizing comprises:
  receiving the plurality of first signals at a plurality of listening devices, the plurality of listening devices being configured to listen to the plurality of first signals and have access to the common time scale;
  transmitting, by the plurality of listening devices to one or more processors, an indication of the first data including the associated times of the received plurality of first signals; and
  generating, by the one or more processors from the one or more processors, timing correction data to synchronize the associated time of each first signal to the common time scale.

* * * * *